(12) United States Patent
Tsai et al.

(10) Patent No.: US 10,666,438 B2
(45) Date of Patent: May 26, 2020

(54) BALANCED COUPLING STRUCTURE FOR PHYSICALLY UNCLONABLE FUNCTION (PUF) APPLICATION

(71) Applicant: Taiwan Semiconductor Manufacturing Co., Ltd., Hsinchu (TW)

(72) Inventors: Jui-Che Tsai, Tainan (TW); Cheng Hung Lee, Hsinchu (TW); Shih-Lien Linus Lu, Hsinchu (TW); Yi-Ju Chen, Taichung (TW)

(73) Assignee: Taiwan Semiconductor Manufacturing Co., Ltd. (TW)

( * ) Notice: Subject to any disclaimer, the term of this patent is extended or adjusted under 35 U.S.C. 154(b) by 0 days.

(21) Appl. No.: 16/160,397

(22) Filed: Oct. 15, 2018

(65) Prior Publication Data

US 2020/0020364 A1 Jan. 16, 2020

Related U.S. Application Data

(60) Provisional application No. 62/697,668, filed on Jul. 13, 2018.

(51) Int. Cl.
*H04L 9/32* (2006.01)
*G11C 7/08* (2006.01)
(Continued)

(52) U.S. Cl.
CPC .............. *H04L 9/32* (2013.01); *G06F 21/73* (2013.01); *G11C 7/08* (2013.01); *G11C 7/12* (2013.01); *H04L 9/3278* (2013.01)

(58) Field of Classification Search
CPC ............ G11C 7/08; G11C 7/12; H04L 9/3278
See application file for complete search history.

(56) References Cited

U.S. PATENT DOCUMENTS 5,706,241 A 1/1998 Nakamura et al.
6,711,092 B1 3/2004 Sabharwal
(Continued)

FOREIGN PATENT DOCUMENTS

JP 2013131277 A 7/2013
TW 201743325 A 12/2017

OTHER PUBLICATIONS

Office Action, dated Nov. 1, 2019, for Taiwanese Intellectual Property Office Patent Appl. No. 108107031, 3 pages.

*Primary Examiner* — Ajay Ojha
(74) *Attorney, Agent, or Firm* — Sterne, Kessler, Goldstein & Fox P.L.L.C.

(57) ABSTRACT

A memory storage device is fabricated using a semiconductor fabrication process. Often times, manufacturing variations and/or misalignment tolerances present within the semiconductor fabrication process can cause the memory storage device to differ from other memory storage devices similarly designed and fabricated by the semiconductor fabrication process. For example, uncontrollable random physical processes in the semiconductor fabrication process can cause small differences, such as differences in doping concentrations, oxide thicknesses, channel lengths, structural widths, and/or parasitics to provide some examples, between these memory storage devices. These small differences can cause bitlines within the memory storage device to be physically unique with no two bitlines being identical. As a result, the uncontrollable random physical processes in the semiconductor fabrication process can cause electronic data read from the memory storage device to propagate along the bitlines at different rates. This physical uniqueness of the bitlines can be utilized to implement a physical unclonable function (PUF) allowing the memory storage device to be differentiated from other memory storage (Continued)

devices similarly designed and fabricated by the semiconductor fabrication process.

20 Claims, 13 Drawing Sheets

(51) Int. Cl.
*G11C 7/12* (2006.01)
*G06F 21/73* (2013.01)

(56) References Cited

U.S. PATENT DOCUMENTS

| | | | |
|---|---|---|---|
| 9,030,245 B2 | 5/2015 | Sakashita et al. | |
| 9,608,827 B1* | 3/2017 | Trimberger | G11C 11/419 |
| 9,886,998 B2 | 2/2018 | Arsovski et al. | |
| 2011/0051483 A1 | 3/2011 | Chang et al. | |
| 2015/0207627 A1* | 7/2015 | Yamamoto | H04L 9/32 |
| | | | 713/168 |
| 2016/0065379 A1* | 3/2016 | Holcomb | H04L 9/3278 |
| | | | 713/189 |
| 2017/0017808 A1* | 1/2017 | Kwong | G06F 21/73 |

* cited by examiner

US 10,666,438 B2

BALANCED COUPLING STRUCTURE FOR PHYSICALLY UNCLONABLE FUNCTION (PUF) APPLICATION

CROSS-REFERENCE TO RELATED APPLICATIONS

The present application claims the benefit of U.S. Provisional Patent Appl. No. 62/697,668, filed Jul. 13, 2018, which is incorporated herein by reference in its entirety.

BACKGROUND

An integrated circuit represents a collection of electronic circuits that are formed onto a semiconductor substrate, such as a silicon crystal to provide an example, using a semiconductor fabrication process. Often times, manufacturing variations and/or misalignment tolerances present within the semiconductor fabrication process can cause integrated circuits fabricated by the semiconductor fabrication process to differ from each other. For example, uncontrollable random physical processes in the semiconductor fabrication process can cause small differences, such as differences in doping concentrations, oxide thicknesses, channel lengths, structural widths, and/or parasitics to provide some examples, in the integrated circuits. These small differences are maintained within process limits of the semiconductor fabrication process and usually do not affect the proper functioning of the integrated circuits. However, these small differences cause each of the integrated circuits to be physically unique with no two integrated circuits being identical. Physical unclonable functions (PUFs) use this physical uniqueness to differentiate integrated circuits from each other. The PUFs represent challenge-response mechanisms in which mapping between challenges and their corresponding responses are dependent on the complex and variable nature of the physical material used to fabricate the integrated circuits. When the integrated circuits are presented with the challenges, the integrated circuits generate random responses that depend on the physical properties of the integrated circuits themselves.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
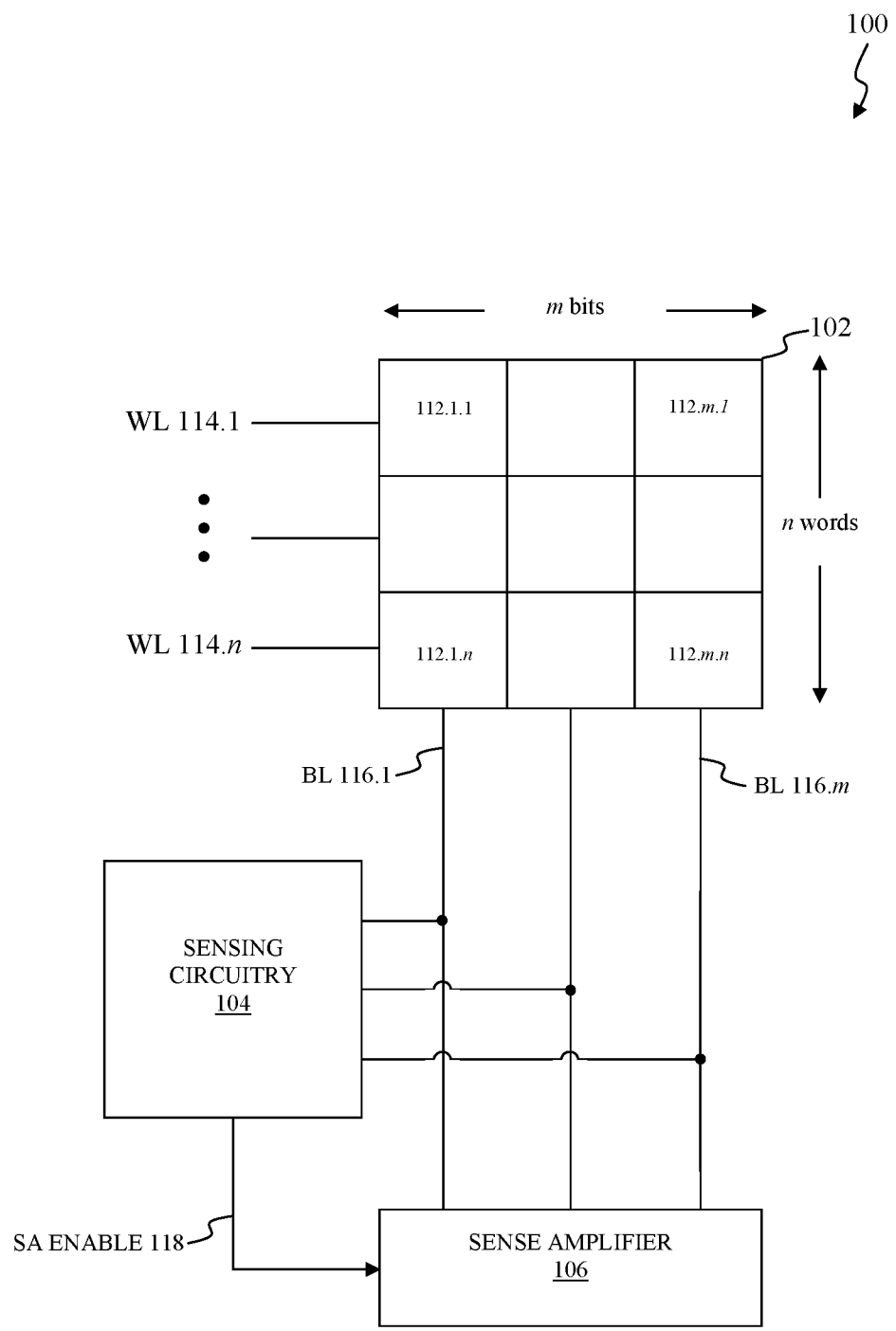
FIG. 1 illustrates a block diagram of a first memory storage device according to an exemplary embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is does not in itself dictate a relationship between the various embodiments and/or configurations discussed.

OVERVIEW

A memory storage device is fabricated using a semiconductor fabrication process. Often times, manufacturing variations and/or misalignment tolerances present within the semiconductor fabrication process can cause the memory storage device to differ from other memory storage devices similarly designed and fabricated by the semiconductor fabrication process. For example, uncontrollable random physical processes in the semiconductor fabrication process can cause small differences, such as differences in doping concentrations, oxide thicknesses, channel lengths, structural widths, and/or parasitics to provide some examples, between these memory storage devices. These small differences can cause bitlines within the memory storage device to be physically unique with no two bitlines being identical. As a result, the uncontrollable random physical processes in the semiconductor fabrication process can cause electronic data read from the memory storage device to propagate along the bitlines at different rates. This physical uniqueness of the bitlines can be utilized to implement a physical unclonable function (PUF) allowing the memory storage device to be differentiated from other memory storage devices similarly designed and fabricated by the semiconductor fabrication process.

Exemplary Memory Storage Device

FIG. 1 illustrates a block diagram of a first memory storage device according to an exemplary embodiment of the present disclosure. A memory storage device 100 can be fabricated using a semiconductor fabrication process. Often times, manufacturing variations and/or misalignment tolerances present within the semiconductor fabrication process can cause the memory storage device 100 to differ from other memory storage devices similarly designed and fabricated by the semiconductor fabrication process. For example, uncontrollable random physical processes in the semiconductor fabrication process can cause small differences, such as differences in doping concentrations, oxide thicknesses, channel lengths, structural widths, and/or parasitics to provide some examples, between these memory storage devices. These small differences are maintained within process limits of the semiconductor fabrication process and usually do not affect the proper functioning of these memory storage devices. However, these small differences cause each of these memory storage devices to be physically unique with no two memory storage devices being identical. Physical unclonable functions (PUFs) use this physical uniqueness to differentiate memory storage device 100 from other memory storage devices similarly designed and fabricated by the semiconductor fabrication process. As illustrated in FIG. 1, the memory storage device 100 includes a memory array 102, sensing circuitry 104, and a sense amplifier 106. Moreover, although not illustrated in FIG. 1, the memory storage device 100 can include other electronic circuitry, such as a write driver, a row-address decoder, and/or a column-address decoder to provide some examples, which will be apparent to those skilled in the relevant art(s) without departing from the spirit and scope of the present disclosure.

As illustrated in FIG. 1, the memory array 102 includes memory cells 112.1.1 through 112.m.n that are configured into an array of m columns and n rows. However, other arrangements for the memory cells 112.1.1 through 112.m.n are possible without departing from the spirit and scope of the present disclosure. In the exemplary embodiment illustrated in FIG. 1, the memory cells 112.1.1 through 112.m.n are connected to corresponding wordlines from among wordlines 114.1 through 114.n and corresponding bitlines (BLs) from among bitlines 116.1 through 116.m. In an exemplary embodiment, the memory cells 112.1.1 through 112.m.n in each of the m columns of the memory array 102 share a common bitline from among the bitlines 116.1 through 116.m. Similarly, the memory cells 112.1.1 through 112.m.n in each of n rows of the memory array 102 share a common wordline from among the wordlines 114.1 through 114.n. For example, as shown in FIG. 1, the memory cells 112.1.1 through 112.m.1 of row one of the memory array 102 share the wordline 114.1 and the memory cells 112.m.1 through 112.m.n of column m of the memory array 102 share the bitline 116.m. In the exemplary embodiment illustrated in FIG. 1, the memory array 102 can be implemented as a volatile memory storage device, such as a random-access memory (RAM) storage device to provide an example, which requires power to maintain the electronic data, or a non-volatile memory storage device, such as a read-only memory (ROM) storage device to provide an example, which can maintain the electronic data even when not powered. The RAM storage device can be implemented in a dynamic random-access memory (DRAM), a static random-access memory (SRAM), and/or a non-volatile random-access memory (NVRAM), often referred to as a flash memory, configuration to provide some examples. The ROM storage device can be implemented in programmable read-only memory (PROM), a one-time programmable ROM (OTP), an erasable programmable read-only memory (EPROM) and/or an electrically erasable programmable read-only memory (EEPROM) configuration to provide some examples.

During operation, the memory storage device 100 can assert various combinations of the wordlines 114.1 through 114.n to read the electronic data from the memory cells 112.1.1 through 112.m.n. As discussed above, the uncontrollable random physical processes in the semiconductor fabrication process can cause small differences, such as differences in doping concentrations, oxide thicknesses, channel lengths, structural widths, and/or parasitics to provide some examples, within the memory storage device 100. For example, these small differences can cause the bitlines 116.1 through 116.m to be physically unique with no two bitlines from among the bitlines 116.1 through 116.m being identical. As a result, the uncontrollable random physical processes in the semiconductor fabrication process causes the electronic data from the memory cells 112.1.1 through 112.m.n to propagate along the bitlines 116.1 through 116.m at different rates. For example, the uncontrollable random physical processes in the semiconductor fabrication process can cause parasitics associated with a first bitline from among the bitlines 116.1 through 116.m to be greater than parasitics associated with a second bitline from among the bitlines 116.1 through 116.m. In this example, the first bitline can be characterized as having a lengthier propagation delay than the second bitline causing the electronic data on the first bitline to discharge the first bitline slower than the electronic data on the second bitline discharges the second bitline. As to be discussed in further detail below, this physical uniqueness of the bitlines 116.1 through 116.m can be utilized to implement a physical unclonable function (PUF) allowing the memory storage device 100 to be differentiated from other memory storage devices similarly designed and fabricated by the semiconductor fabrication process.

As illustrated in FIG. 1, the sensing circuitry 104 senses the electronic data on the bitlines 116.1 through 116.m to provide a sense amplifier (SA) enable control signal 118. The SA enable control signal 118 represents a trigger to cause the sense amplifier 106 to read the electronic data on the bitlines 116.1 through 116.m. In an exemplary embodiment, the SA enable control signal 118 causes the sense amplifier 106 to read the electronic data on the bitlines 116.1 through 116.m before the electronic data at least one of the bitlines 116.1 through 116.m has settled to its steady-state. In the exemplary embodiment illustrated in FIG. 1, the SA enable control signal 118 transitions from a second logical value, such as a logical zero, to a first logical value, such as a logical one, as the electronic data from the memory cells 112.1.1 through 112.m.n propagates along the bitlines 116.1 through 116.m. In an exemplary embodiment, the sensing circuitry 104 can control a rate of this transition, also referred to as a rise-time, of the SA enable control signal 118 to cause the sense amplifier 106 to read the electronic data on the bitlines 116.1 through 116.*m* at different instances in time. For example, the sensing circuitry 104 can increase the rate of this transition to cause the sense amplifier 106 to read the electronic data on the bitlines 116.1 through 116.*m* earlier in time or decrease the rate of this transition to cause the sense amplifier 106 to read the electronic data on the bitlines 116.1 through 116.*m* later in time.

In the exemplary embodiment illustrated in FIG. 1, the sense amplifier 106 reads the electronic data on the bitlines 116.1 through 116.*m* in response to the SA enable control signal 118. As discussed above, the SA enable control signal 118 transitions from the second logical value, such as the logical zero, to the first logical value, such as the logical one, as the electronic data from the memory cells 112.1.1 through 112.*m.n* propagates along the bitlines 116.1 through 116.*m*. In an exemplary embodiment, the sense amplifier 106 reads the electronic data on the bitlines 116.1 through 116.*m* in response to the SA enable control signal 118 being greater than or equal to a sensing threshold, such as a threshold voltage of a p-type metal-oxide-semiconductor field-effect (PMOS) transistor or a threshold voltage of a n-type metal-oxide-semiconductor field-effect (NMOS) transistor to provide some examples. Thereafter, the sense amplifier 106 translates, namely, reads, bitlines having slower propagation times from among one or more groups of the bitlines 116.1 through 116.*m* to be the first logical value, such as the logical one, and bitlines having faster propagation times from among the one or more groups of the bitlines 116.1 through 116.*m* to be the second logical value, such as the logical zero. For example, the sense amplifier 106 determines a difference in voltages among the one or more groups of the bitlines 116.1 through 116.*m*. In this example, the first sense amplifier 106 translates, namely, assigns, a bitline from among the one or more groups of the bitlines 116.1 through 116.*m* having a larger voltage indicative of a slower discharge time to be the first logical value, such as the logical one. As another example, the sense amplifier 106 translates, namely, assigns, a bitline from among the one or more groups of the bitlines 116.1 through 116.*m* having a smaller voltage indicative of a faster discharge time to be the second logical value, such as the logical zero. The propagation times of the electronic data on the one or more groups of the bitlines 116.1 through 116.*m* can differ between the memory storage device 100 and other memory storage devices similarly designed and fabricated by the semiconductor fabrication process. As such, the propagation times for the electronic data on the one or more groups of the bitlines 116.1 through 116.*m* can be utilized to implement a physical unclonable function (PUF) allowing the memory storage device 100 to be differentiated from other memory storage devices similarly designed and fabricated by the semiconductor fabrication process.

Second Exemplary Memory Storage Device

Figure 2:
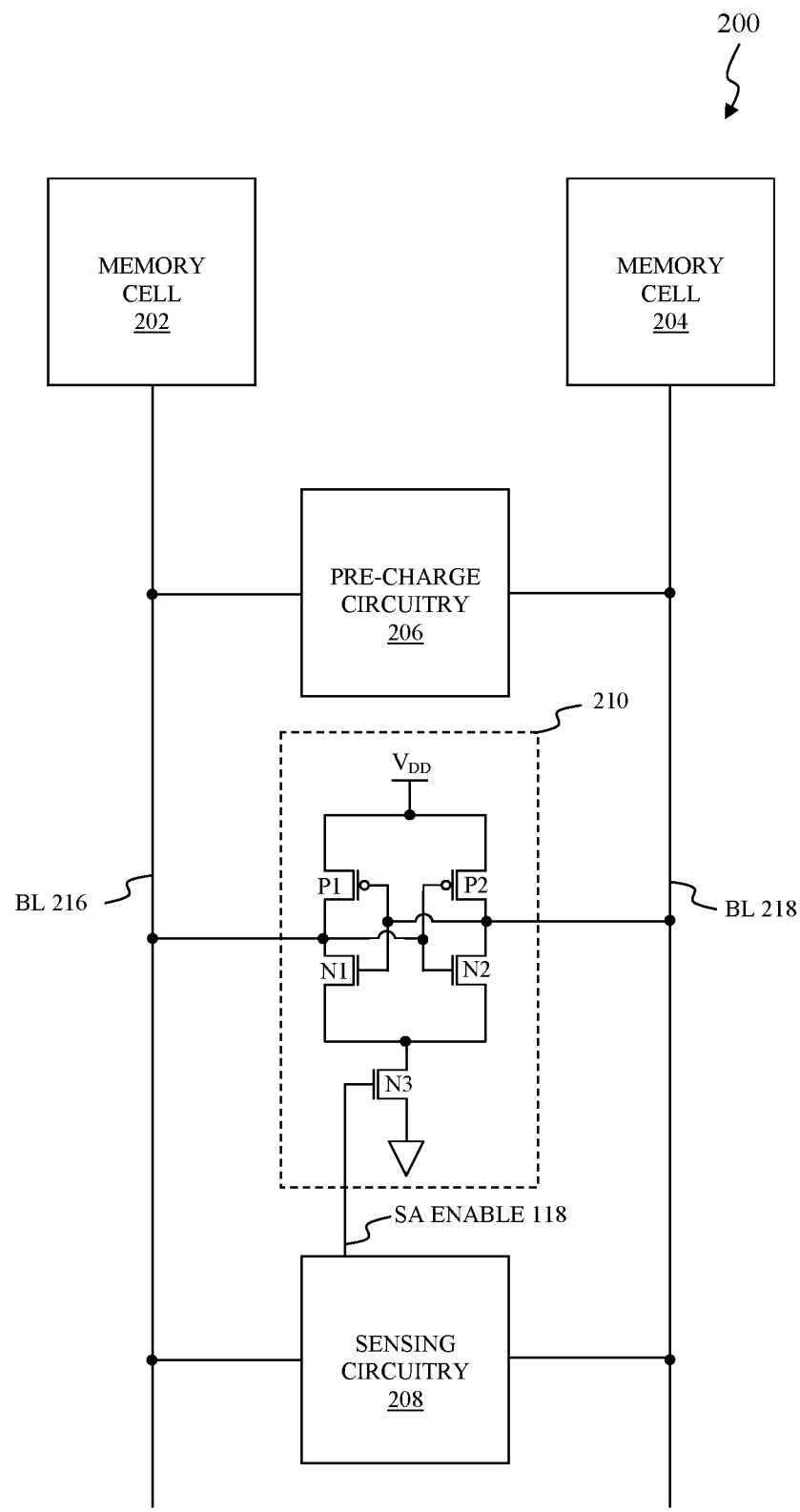
FIG. 2 illustrates a block diagram of a second memory storage device according to an exemplary embodiment of the present disclosure.

FIG. 2 illustrates a block diagram of a second memory storage device according to an exemplary embodiment of the present disclosure. As illustrated in FIG. 2, a memory storage device 200 includes a memory cell 202, a memory cell 204, pre-charge circuitry 206, sensing circuitry 208, and a sense amplifier 210. Moreover, although not illustrated in FIG. 2, the memory storage device 200 can include other electronic circuitry, such as a write driver, a row-address decoder, and/or a column-address decoder to provide some examples, which will be apparent to those skilled in the relevant art(s) without departing from the spirit and scope of the present disclosure. The memory storage device 200 can represent an exemplary embodiment of the memory storage device 100 as described above in FIG. 1. As such, the memory cell 202 and the memory cell 204 can represent exemplary embodiments of two memory cells from among the memory cells 112.1.1 through 112.*m.n* as described above in FIG. 1. Similarly, the sensing circuitry 208 and the sense amplifier 210 can represent exemplary embodiments of the sensing circuitry 104 and the sense amplifier 106, respectively, as described above in FIG. 1.

During operation, the pre-charge circuitry 206 can charge, also referred to as pre-charge, a bitline 216 associated with the memory cell 202 and bitline 218 associated with the memory cell 204 to a first logical value, such as a logical one. This charging of the bitline 216 and the bitline 218 is referred to as pre-charging since it occurs before electronic data is read from the electronic data from the memory cell 202 and the memory cell 204. After pre-charging of the memory cell 202 and the memory cell 204, the memory storage device 100 can read the electronic data from the memory cell 202 and the memory cell 204. In some situations, the electronic data from the memory cell 202 and the memory cell 204 discharges the bitline 216 and the bitline 218, respectively, from being at the first logical value, such as the logical one, to be at the second logical value, such as the logical zero.

As discussed above, the uncontrollable random physical processes in the semiconductor fabrication process can cause small differences, such as differences in doping concentrations, oxide thicknesses, channel lengths, structural widths, and/or parasitics to provide some examples, within the memory storage device 200. For example, these small differences can cause the memory cell 202 and the memory cell 204 to be physically unique. As a result, the uncontrollable random physical processes in the semiconductor fabrication process causes the electronic data from the memory cell 202 and the memory cell 204 to discharge the bitline 216 and the bitline 218, respectively, from being at the first logical value, such as the logical one, to be at the second logical value, such as the logical zero, at different rates. For example, the uncontrollable random physical processes in the semiconductor fabrication process can cause parasitics associated with the bitline 216 to be greater than parasitics associated with the bitline 218. In this example, the bitline 216 can be characterized as having a longer propagation delay than the bitline 218 causing the electronic data on the bitline 216 to discharge the bitline 216 more slowly than the electronic data on the bitline 218 discharges the bitline 218. As to be discussed in further detail below, this physical uniqueness of the bitline 216 and the bitline 218 can be utilized to implement a physical unclonable function (PUF) allowing the memory storage device 200 to be differentiated from other memory storage devices similarly designed and fabricated by the semiconductor fabrication process.

As illustrated in FIG. 2, the sensing circuitry 208 senses the electronic data on the bitline 216 and the bitline 218 to provide the SA enable control signal 118 in a substantially similar manner as the sensing circuitry 104 as described above in FIG. 1. In the exemplary embodiment illustrated in FIG. 2, the sense amplifier 210 reads the electronic data on the bitline 216 and the bitline 218 in response to the SA enable control signal 118. As illustrated in FIG. 2, the sense amplifier 210 includes p-type metal-oxide-semiconductor field-effect (PMOS) transistors P1 and P2 and n-type metal-oxide-semiconductor field-effect (NMOS) transistors N1, N2, and N3. As discussed above, the SA enable control signal 118 transitions from the second logical value, such as the logical zero, to the first logical value, such as the logical one, as the electronic data from the memory cell 202 and the memory cell 204 propagates along the bitline 216 and the bitline 218, respectively. In the exemplary embodiment illustrated in FIG. 2, the NMOS transistor N3 is activated when the SA enable control signal 118 greater than or equal to its corresponding threshold voltage to activate the sense amplifier 210 to read the electronic data on the bitline 216 and the bitline 218.

As illustrated in FIG. 2, the PMOS transistor P1 and the NMOS transistor N1 are arranged to form a first logical inverting circuit and the PMOS transistor P2 and the NMOS transistor N2 are arranged to form a second logical inverting circuit with an input of the first logical inverting circuit being connected to an output of the second logical inverting circuit and an input of the second logical inverting circuit being connected to an output of the first logical inverting circuit to form a pair of cross-coupled inverting circuits. As described above, the uncontrollable random physical processes in the semiconductor fabrication process causes the electronic data from the memory cell 202 and the memory cell 204 to discharge the bitline 216 and the bitline 218, respectively, from being at the first logical value, such as the logical one, to be at the second logical value, such as the logical zero, at different rates. The first logical inverting circuit and the second logical inverting circuit translate, namely, assign, a bitline having a slower discharge time from among the bitline 216 and the bitline 218 to be the first logical value, such as the logical one, and a bitline having a faster discharge time from among the bitline 216 and the bitline 218 to be the second logical value, such as the logical zero.

As described above, the uncontrollable random physical processes in the semiconductor fabrication process causes the electronic data from the memory cell 202 and the memory cell 204 to discharge the bitline 216 and the bitline 218, respectively, at different rates. The rates of discharge of the bitline 216 and the bitline 218 can differ between the memory storage device 200 and other memory storage devices similarly designed and fabricated by the semiconductor fabrication process. As such, the rates of discharge of the bitline 216 and the bitline 218 can be utilized to implement a physical unclonable function (PUF) allowing the memory storage device 200 to be differentiated from other memory storage devices similarly designed and fabricated by the semiconductor fabrication process.

Exemplary NOR Sensing Circuitry

Figure 3:
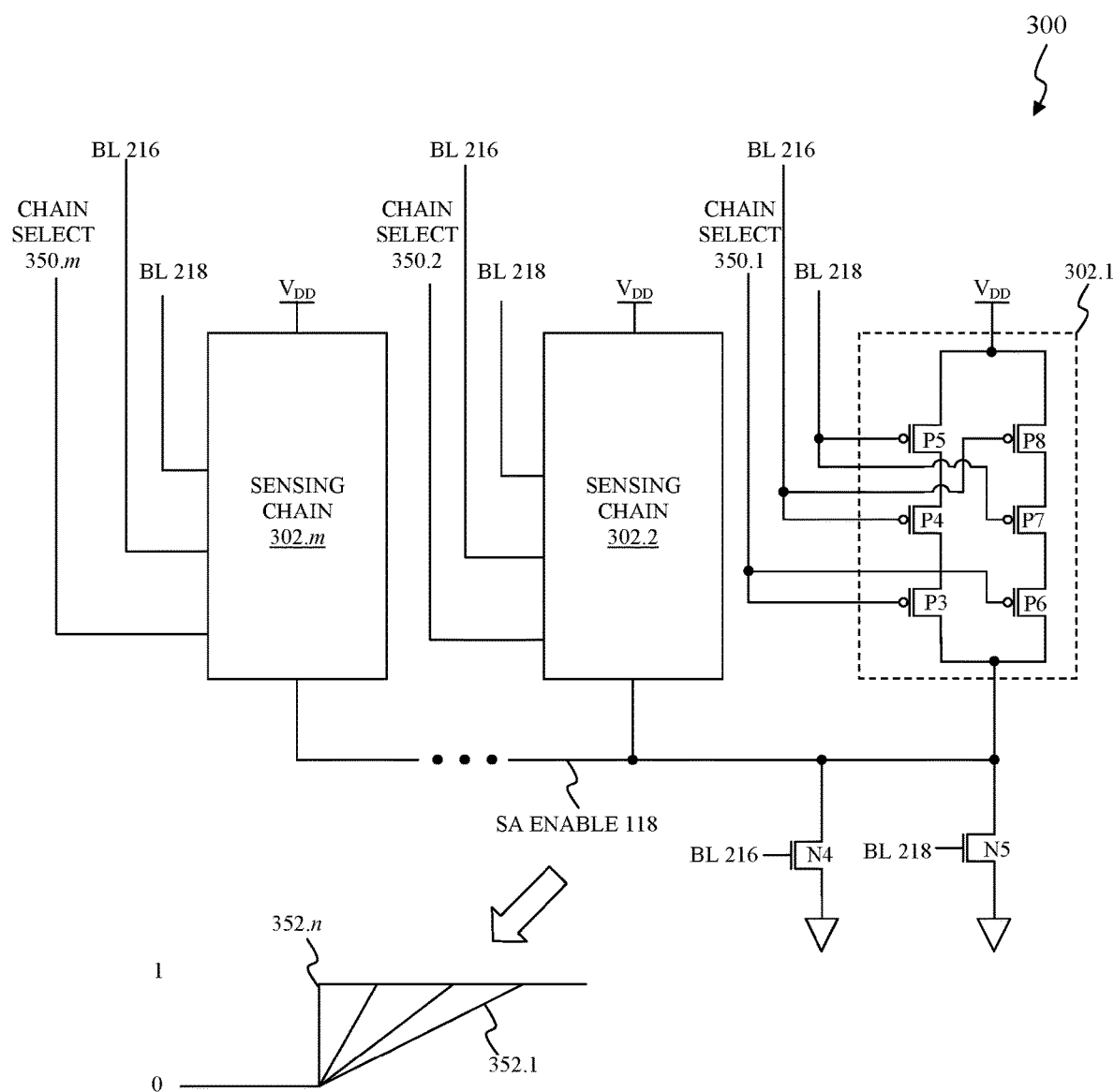
FIG. 3 illustrates a block diagram of first exemplary sensing circuitry that can be implemented within the memory storage device according to an exemplary embodiment of the present disclosure.

FIG. 3 illustrates a block diagram of first exemplary sensing circuitry that can be implemented within the memory storage device according to an exemplary embodiment of the present disclosure. NOR sensing circuitry 300 senses the electronic data on the bitline 216 and the bitline 218 to provide the SA enable control signal 118 in a substantially similar manner as the sensing circuitry 104 as described above in FIG. 1. As illustrated in FIG. 3, the NOR sensing circuitry 300 includes sensing chains 302.1 through 302.$m$ and NMOS transistors N4 and N5. The NOR sensing circuitry 300 can represent an exemplary embodiment of the sensing circuitry 208 as described above in FIG. 2.

As described above in FIG. 1 and FIG. 2, the SA enable control signal 118 transitions from the second logical value, such as the logical zero, to the first logical value, such as the logical one, as the electronic data from the memory cell 202 and the memory cell 204 propagates along the bitline 216 and the bitline 218, respectively. As illustrated in FIG. 3, the NMOS transistors N4 and N5 are activated, namely, turned on, when the bitline 216 and the bitline 218 are pre-charged to the first logical value, such as a logical one, causing the SA enable control signal 118 to be at the second logical value, such as the logical zero. And as to be described in further detail below, the sensing chains 302.1 through 302.$m$ are deactivated, namely, turned off, when the bitline 216 and the bitline 218 are pre-charged to the first logical value, such as a logical one.

As described above in FIG. 2, the electronic data discharges the bitline 216 and the bitline 218, respectively, from being at the first logical value, such as the logical one, to be at the second logical value, such as the logical zero. As the bitline 216 and the bitline 218 are discharging, the NMOS transistors N4 and N5 become deactivated, namely, turned off. Additionally, one or more of the sensing chains 302.1 through 302.$m$ become activated, namely, turned on, causing the SA enable control signal 118 to rise from the second logical value, such as the logical zero, to the first logical value, such as the logical one. And as similar to the sensing circuitry 104 as described above in FIG. 1, the NOR sensing circuitry 300 as illustrated in FIG. 3 can similarly control a rate of this transition of the SA enable control signal 118 from the second logical value, such as the logical zero, to the first logical value, such as the logical one.

In the exemplary embodiment illustrated in FIG. 3, the NOR sensing circuitry 300 can selectively activate various combinations of the sensing chains 302.1 through 302.$m$ by asserting various combinations of chain select control signals 350.1 through 350.$m$ to control the rate of the transition of the SA enable control signal 118 from the second logical value, such as the logical zero, to the first logical value, such as the logical one. As illustrated in FIG. 3, the various combinations of the sensing chains 302.1 through 302.$m$ provide various transition rates 352.1 through 352.$n$ for the SA enable control signal 118 to transition from the second logical value, such as the logical zero, to the first logical value, such as the logical one. In this exemplary embodiment, the NOR sensing circuitry 300 can selectively activate more sensing chains 302.1 through 302.$m$ to increase the rate of this transition of the SA enable control signal 118 from the second logical value, such as the logical zero, to the first logical value, such as the logical one. Alternatively, or in addition to, the NOR sensing circuitry 300 can selectively deactivate more sensing chains 302.1 through 302.$m$ to decrease the rate of this transition of the SA enable control signal 118 from the second logical value, such as the logical zero, to the first logical value, such as the logical one. In a first example, the NOR sensing circuitry 300 can selectively activate all of the sensing chains 302.1 through 302.$m$ to provide a fastest transition rate 352.$n$ for the SA enable control signal 118. In a second example, the NOR sensing circuitry 300 can selectively activate only the sensing chain 302.1 to provide a slowest transition rate 352.1 for the SA enable control signal 118. The SA enable control signal 118 with the fastest transition rate 352.$n$ from the first example causes a sense amplifier, such as the sense amplifier 210 to provide an example, to read the electronic data on the bitline 216 and the bitline 218 earlier in time than the SA enable control signal 118 with the slowest transition rate 352.1 from the second example. In an exemplary embodiment, the electronic data on the bitline 216 and the bitline 218 is read at an instance in time when a difference, or read margin (RM), between the bitline 216 and the bitline 218 is largest. In this exemplary embodiment, the NOR sensing circuitry 300 can selectively activate only the sensing chain 302.2 to cause the sense amplifier to read the electronic data on the bitline 216 and the bitline 218 when the RM between the bitline 216 and the bitline 218 is largest.

As illustrated in FIG. 3, each of the sensing chains 302.1 through 302.$m$ is implemented in a substantially similar manner as each other; therefore, only the sensing chain 302.1 from among the sensing chains 302.1 through 302.*m* is to be described in further detail. In the exemplary embodiment illustrated in FIG. 3, the sensing chain 302.1 includes the PMOS transistors P3 through P8. As illustrated in FIG. 3, the PMOS transistors P3 through P5 are arranged to form a first logical NOR gate and the PMOS transistors P6 through P8 are arranged to form a second logical NOR gate. As such, the first logical NOR gate sources current from the operational voltage supply $V_{DD}$ to the SA enable control signal 118 when the bitline 216 and the bitline 218 have discharged to be less than or equal to threshold voltages of the PMOS transistors P4 and P5 and the chain select control signal 350.1 is at the second logical value, such as the logical zero. Similarly, the second logical NOR gate sources current from the operational voltage supply $V_{DD}$ to the SA enable control signal 118 when the bitline 218 and the bitline 216 have discharged to be less than or equal to threshold voltages of the PMOS transistors P7 and P8 and the chain select control signal 350.1 is at the second logical value, such as the logical zero. In some situations, the sensing chain 302.1 can be implemented using either the first logical NOR gate or the second logical NOR gate. In these situations, the PMOS transistors of the first logical NOR gate or the second logical NOR gate are implemented using minimum sizing as defined by the semiconductor fabrication process.

Moreover, the sensing chain 302.1 can be characterized as a balanced coupled structure which balances a first parasitic capacitance between the bitline 216 and the SA enable control signal 118 and a second parasitic capacitance between the bitline 218 and the SA enable control signal 118. In the exemplary embodiment illustrated in FIG. 3, the first parasitic capacitance can be characterized as being a near parasitic capacitance as the first parasitic capacitance is physically closer to the SA enable control signal 118 than the second parasitic capacitance. The second parasitic capacitance can be characterized as being a far parasitic capacitance as the second parasitic capacitance is physically further from the SA enable control signal 118 than the first parasitic capacitance. Often times, the near parasitic capacitance is greater than the far parasitic capacitance which can cause an unbalance between the bitline 216 and the bitline 218. In the exemplary embodiment illustrated in FIG. 3, the sensing chain 302.1 balances contributions of the near parasitic capacitance and the far parasitic capacitance between the first logical NOR gate and the second logical NOR gate by twisting the bitline 216 and the bitline 218 between the first logical NOR gate and the second logical NOR gate. As illustrated in FIG. 3, this twisting of the bitline 216 and the bitline 218 is implemented by electrically coupling gates of the PMOS transistors P4 and P8 to the bitline 216 and gates of the PMOS transistors P5 and P7 to the bitline 218.

Figure 4:
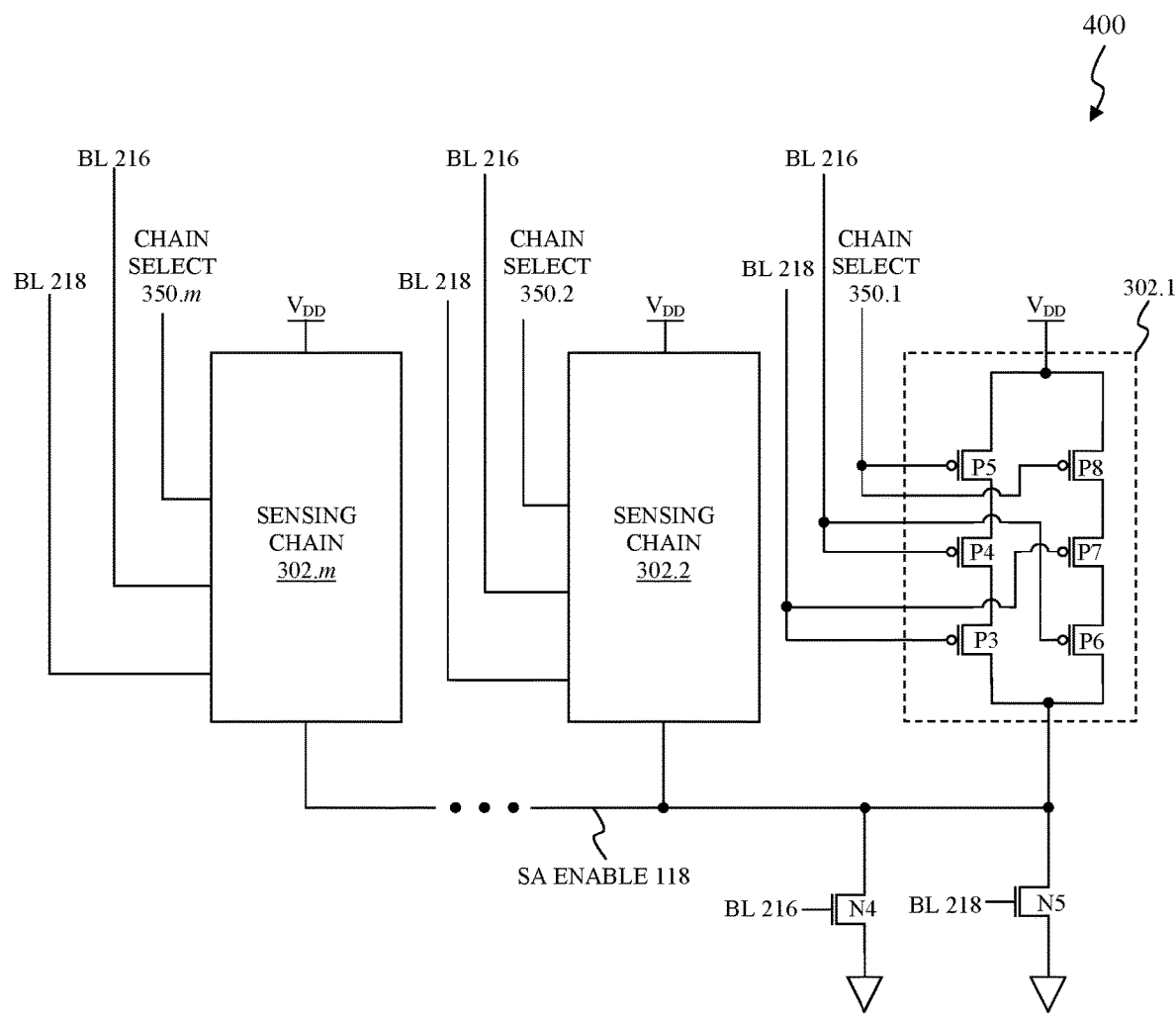
FIG. 4 illustrates a block diagram of second exemplary sensing circuitry that can be implemented within the memory storage device according to an exemplary embodiment of the present disclosure.

FIG. 4 illustrates a block diagram of second exemplary sensing circuitry that can be implemented within the memory storage device according to an exemplary embodiment of the present disclosure. NOR sensing circuitry 400 senses the electronic data on the bitline 216 and the bitline 218 to provide the SA enable control signal 118 in a substantially similar manner as the sensing circuitry 104 as described above in FIG. 1. As illustrated in FIG. 4, the NOR sensing circuitry 400 includes the sensing chains 302.1 through 302.*m* and NMOS transistors N4 and N5 as described above in FIG. 3. The NOR sensing circuitry 400 can represent an exemplary embodiment of the sensing circuitry 208 as described above in FIG. 2. The NOR sensing circuitry 400 shares many substantially similar features as the NOR sensing circuitry 300 as described above in FIG. 3; therefore, only differences between the NOR sensing circuitry 300 and the NOR sensing circuitry 400 are to be discussed in further detail below.

As illustrated in FIG. 4, the PMOS transistors P3 through P5 are arranged to form the first logical NOR gate and the PMOS transistors P6 through P8 are arranged to form the second logical NOR gate as described above in FIG. 3. However in the exemplary embodiment illustrated in FIG. 4, the first logical NOR gate sources current from the operational voltage supply $V_{DD}$ to the SA enable control signal 118 when the bitline 216 and the bitline 218 have discharged to be less than or equal to threshold voltages of the PMOS transistors P4 and P3 and the chain select control signal 350.1 is at the second logical value, such as the logical zero. Similarly, the second logical NOR gate sources current from the operational voltage supply $V_{DD}$ to the SA enable control signal 118 when the bitline 218 and the bitline 216 have discharged to be less than or equal to threshold voltages of the PMOS transistors P7 and P6 and the chain select control signal 350.1 is at the second logical value, such as the logical zero.

Figure 5:
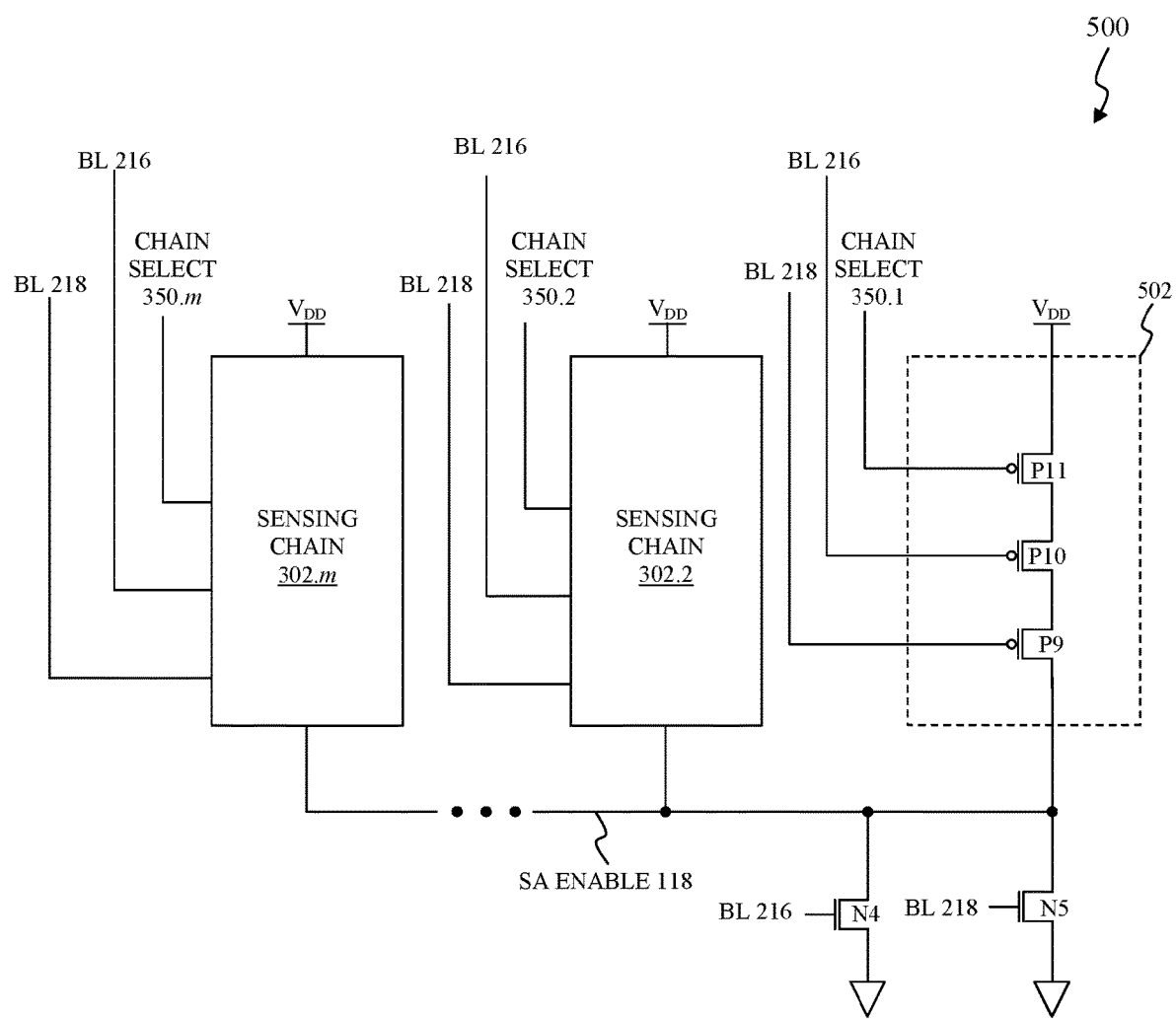
FIG. 5 illustrates a block diagram of third exemplary sensing circuitry that can be implemented within the memory storage device according to an exemplary embodiment of the present disclosure.

FIG. 5 illustrates a block diagram of third exemplary sensing circuitry that can be implemented within the memory storage device according to an exemplary embodiment of the present disclosure. NOR sensing circuitry 500 senses the electronic data on the bitline 216 and the bitline 218 to provide the SA enable control signal 118 in a substantially similar manner as the sensing circuitry 104 as described above in FIG. 1. As illustrated in FIG. 5, the NOR sensing circuitry 500 includes sensing chains 302.2 through 302.*m*, a sensing chain 502, and the NMOS transistors N4 and N5. The NOR sensing circuitry 500 can represent an exemplary embodiment of the sensing circuitry 208 as described above in FIG. 2. The NOR sensing circuitry 500 shares many substantially similar features as the NOR sensing circuitry 300 as described above in FIG. 3; therefore, only differences between the NOR sensing circuitry 300 and the NOR sensing circuitry 500 are to be discussed in further detail below.

As illustrated in FIG. 5, the NOR sensing circuitry 500 includes the sensing chains 302.2 through 302.*m* as described above in FIG. 3. In the exemplary embodiment illustrated in FIG. 5, the sensing chain 502 includes the PMOS transistors P9 through P11. The PMOS transistors P9 through P11 are arranged to form the first logical NOR gate as described above in FIG. 3. In the exemplary embodiment illustrated in FIG. 5, the PMOS transistors P9 through P11 are implemented using minimum sizing as defined by the semiconductor fabrication process. For example, the PMOS transistors P9 through P11 can be implemented a Fin Field-effect transistor (FinFET) having two (2) fins in a 16 nanometer (nm) semiconductor fabrication technology node.

Although FIG. 5 illustrates the NOR sensing circuitry 500 as further including the sensing chain 502 as a substitute for the sensing chain 302.1 as described above in FIG. 3, those skilled in the relevant art(s) will recognize any of the sensing chains 302.1 through 302.*m* as described above in FIG. 3 can be substituted with similar sensing chains 502 which will be apparent to those skilled in the relevant art(s) without departing from the spirit and scope of the present disclosure.

Figure 6:
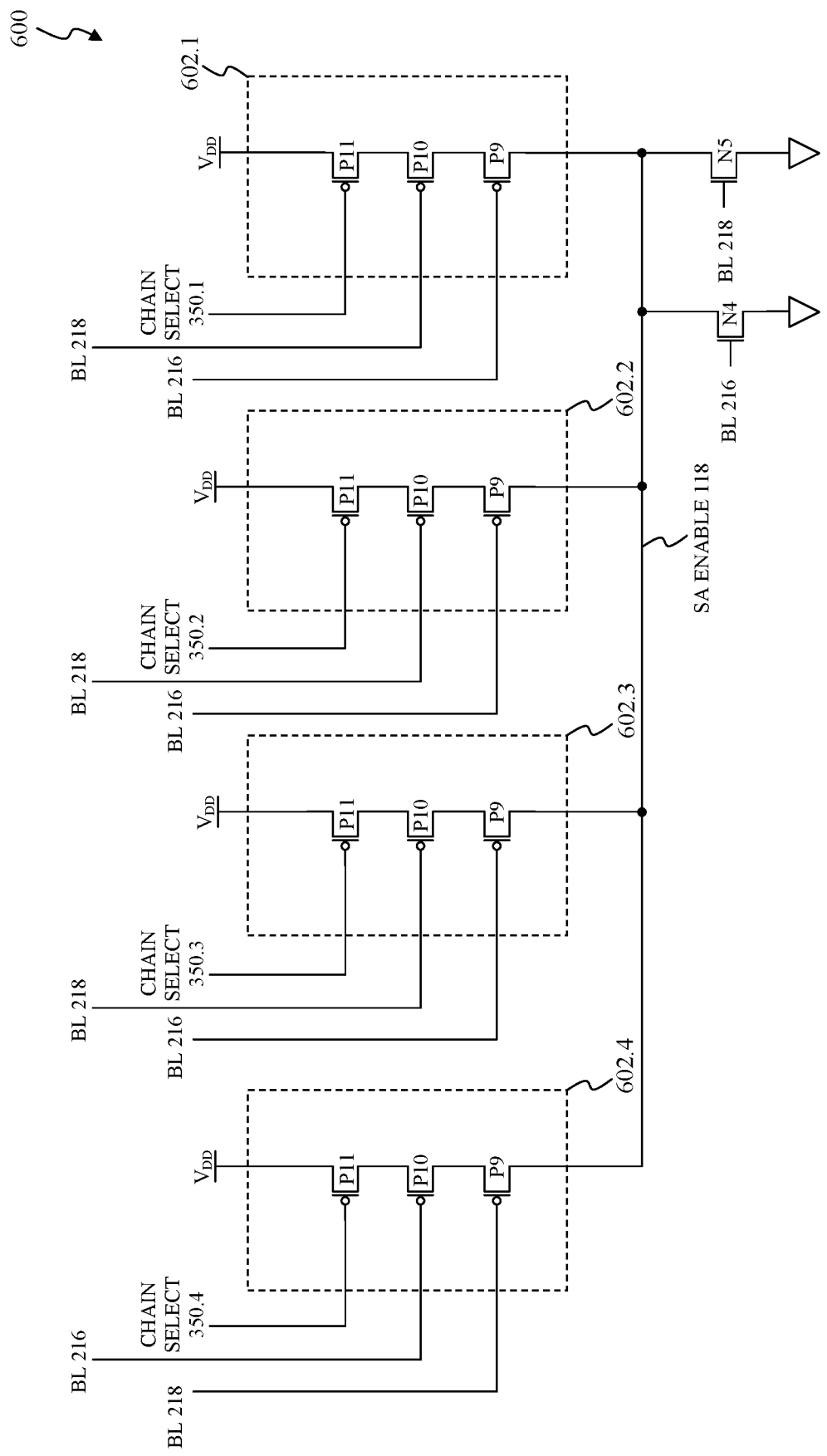
FIG. 6 illustrates a block diagram of fourth exemplary sensing circuitry that can be implemented within the memory storage device according to an exemplary embodiment of the present disclosure.

For example, FIG. 6 illustrates a block diagram of fourth exemplary sensing circuitry that can be implemented within the memory storage device according to an exemplary embodiment of the present disclosure. NOR sensing circuitry 600 senses the electronic data on the bitline 216 and the bitline 218 to provide the SA enable control signal 118 in a substantially similar manner as the sensing circuitry 104 as described above in FIG. 1. As illustrated in FIG. 6, the NOR sensing circuitry 600 includes sensing chains 602.1 through 602.4 and the NMOS transistors N4 and N5. The NOR sensing circuitry 600 can represent an exemplary embodiment of the sensing circuitry 208 as described above in FIG. 2. The NOR sensing circuitry 600 shares many substantially similar features as the NOR sensing circuitry 300 as described above in FIG. 3; therefore, only differences between the NOR sensing circuitry 300 and the NOR sensing circuitry 600 are to be discussed in further detail below.

In the exemplary embodiment illustrated in FIG. 6, the sensing chains 602.1 through 602.4 are implemented in a substantially similar manner as the sensing chain 502 as described above in FIG. 5. Moreover as illustrated in FIG. 6, the sensing chains 602.3 and 602.4 balance contributions of the near parasitic capacitance and the far parasitic capacitance between the logical NOR gate of the sensing chain 602.4 and the logical NOR gate of the sensing chain 602.3 by twisting the bitline 216 and the bitline 218 between these logical NOR gates.

Figure 7:
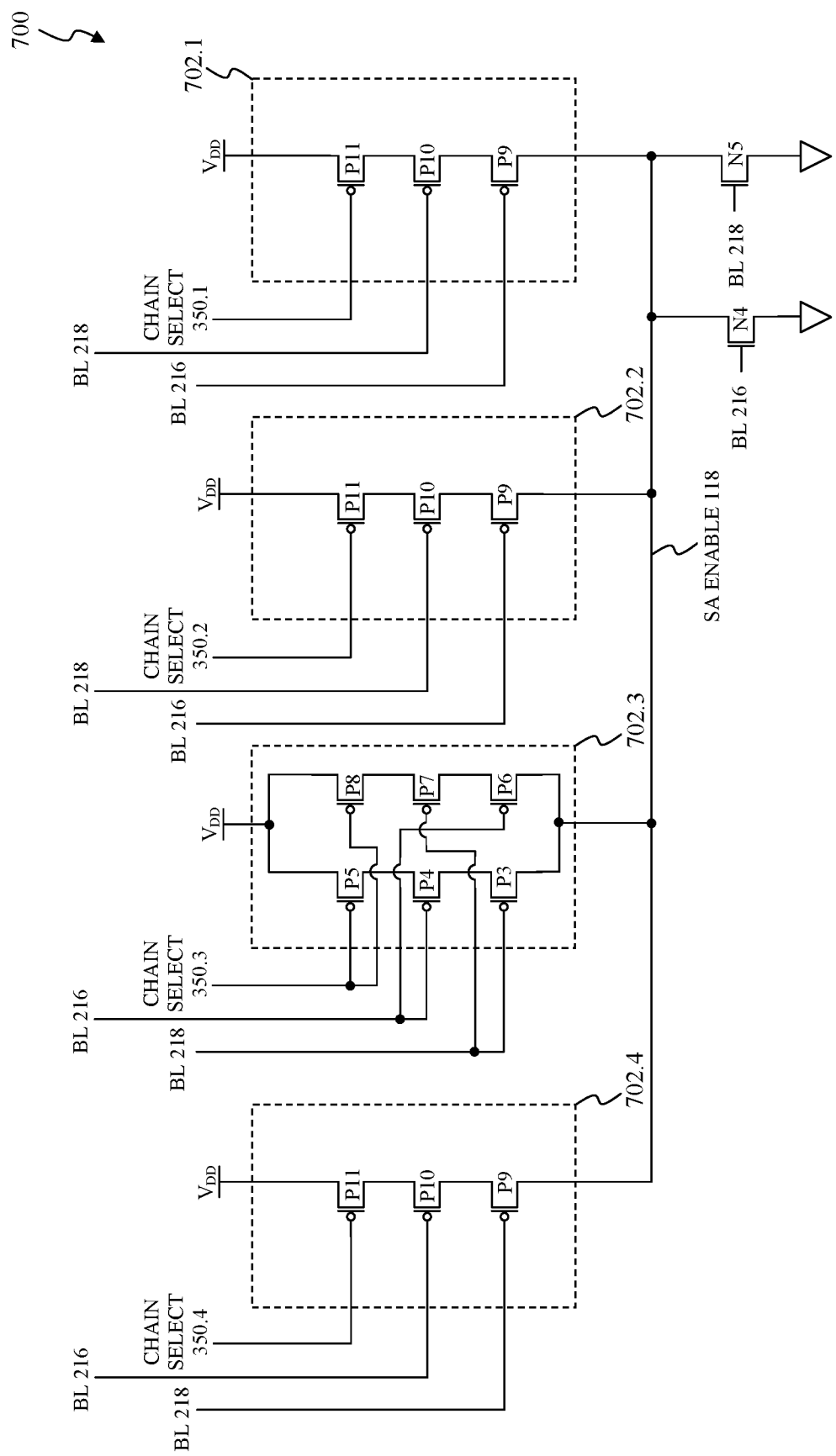
FIG. 7 illustrates a block diagram of fifth exemplary sensing circuitry that can be implemented within the memory storage device according to an exemplary embodiment of the present disclosure.

As another example, FIG. 7 illustrates a block diagram of fifth exemplary sensing circuitry that can be implemented within the memory storage device according to an exemplary embodiment of the present disclosure. NOR sensing circuitry 700 senses the electronic data on the bitline 216 and the bitline 218 to provide the SA enable control signal 118 in a substantially similar manner as the sensing circuitry 104 as described above in FIG. 1. As illustrated in FIG. 7, the NOR sensing circuitry 700 includes sensing chains 702.1 through 702.4 and the NMOS transistors N4 and N5. The NOR sensing circuitry 700 can represent an exemplary embodiment of the sensing circuitry 208 as described above in FIG. 2. The NOR sensing circuitry 700 shares many substantially similar features as the NOR sensing circuitry 300 as described above in FIG. 3; therefore, only differences between the NOR sensing circuitry 300 and the NOR sensing circuitry 700 are to be discussed in further detail below. In the exemplary embodiment illustrated in FIG. 7, the sensing chains 702.1, 702.2, and 702.4 are implemented in a substantially similar manner as the sensing chain 502 as described above in FIG. 5 and the sensing chain 702.3 is implemented in a substantially similar manner as the sensing chain 302.1 as described above in FIG. 3.

Exemplary NAND Sensing Circuitry

Figure 8:
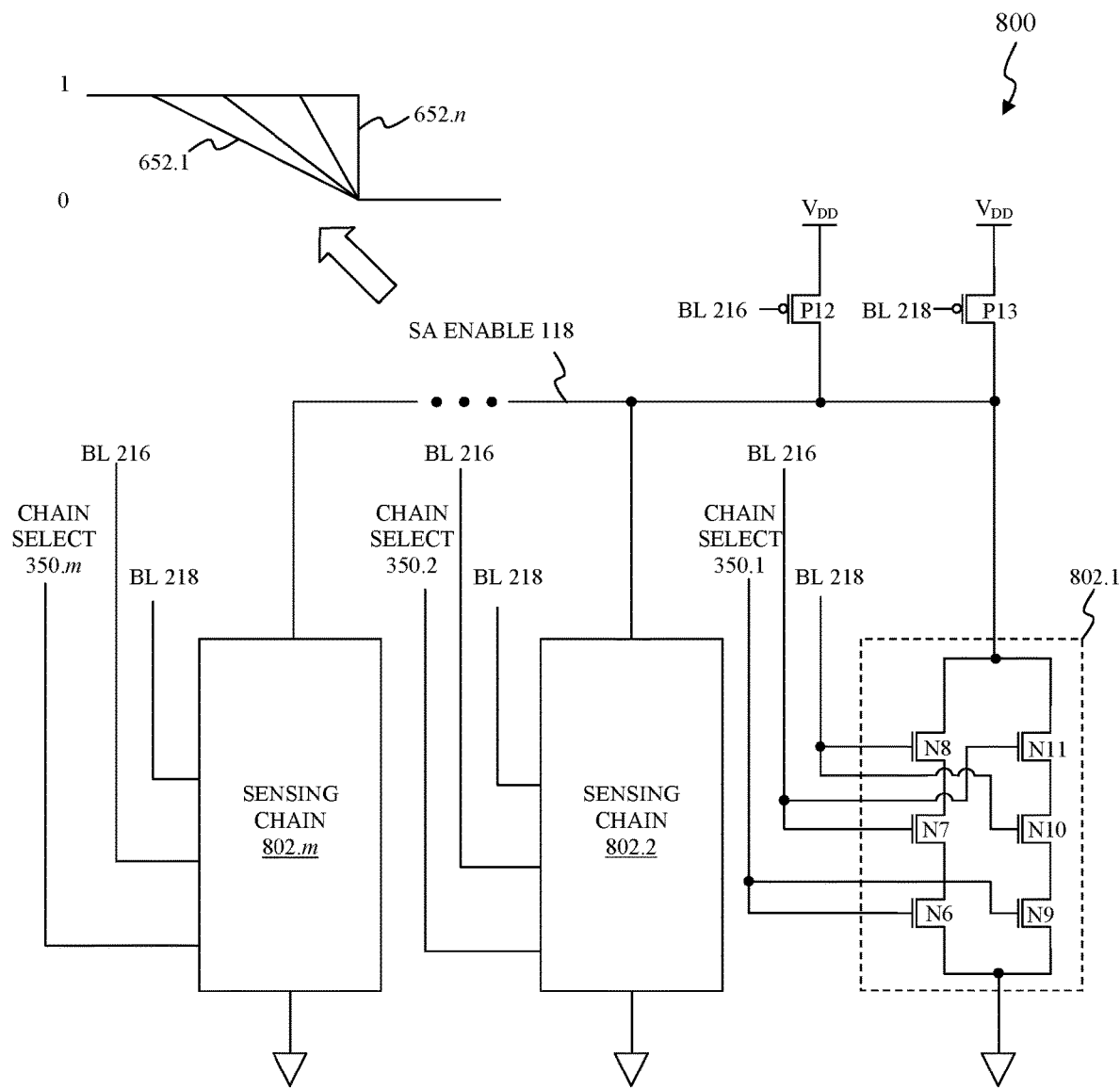
FIG. 8 illustrates a block diagram of sixth exemplary sensing circuitry that can be implemented within the memory storage device according to an exemplary embodiment of the present disclosure.

FIG. 8 illustrates a block diagram of sixth exemplary sensing circuitry that can be implemented within the memory storage device according to an exemplary embodiment of the present disclosure. NAND sensing circuitry 800 senses the electronic data on the bitline 216 and the bitline 218 to provide the SA enable control signal 118 in a substantially similar manner as the sensing circuitry 104 as described above in FIG. 1. As illustrated in FIG. 8, the NAND sensing circuitry 800 includes sensing chains 802.1 through 802.$m$ and PMOS transistors P12 and P13. The NAND sensing circuitry 800 can represent an exemplary embodiment of the sensing circuitry 208 as described above in FIG. 2. The NAND sensing circuitry 800 shares many substantially similar features as the NOR sensing circuitry 300 as described above in FIG. 3; therefore, only differences between the NOR sensing circuitry 300 and the NAND sensing circuitry 800 are to be discussed in further detail below.

As illustrated in FIG. 8, the PMOS transistors P12 and P13 are deactivated, namely, turned off, when the bitline 216 and the bitline 218 are pre-charged to the first logical value, such as a logical one, causing the SA enable control signal 118 to be at the second logical value, such as the logical zero. And as to be described in further detail below, one or more of the sensing chains 802.1 through 802.$m$ are activated, namely, turned on, when the bitline 216 and the bitline 218 are pre-charged to the first logical value, such as a logical one.

As described above in FIG. 2, the electronic data discharges the bitline 216 and the bitline 218, respectively, from being at the first logical value, such as the logical one, to be at the second logical value, such as the logical zero. As the bitline 216 and the bitline 218 are discharging, the PMOS transistors P12 and P13 become activated, namely, turned on. Additionally, the sensing chains 802.1 through 802.$m$ become deactivated, namely, turned off, causing the SA enable control signal 118 to rise from the second logical value, such as the logical zero, to the first logical value, such as the logical one. And as similar to the sensing circuitry 108 as described above in FIG. 1 and the NOR sensing circuitry 300 as described in FIG. 3, the NAND sensing circuitry 800 as illustrated in FIG. 8 can similarly control a rate of this transition of the SA enable control signal 118 from the second logical value, such as the logical zero, to the first logical value, such as the logical one.

In the exemplary embodiment illustrated in FIG. 8, the NAND sensing circuitry 800 can selectively activate various combinations of the sensing chains 802.1 through 802.$m$ by asserting various combinations of chain select control signals 350.1 through 350.$m$ to control the rate of the transition of the SA enable control signal 118 from the first logical value, such as the logical one, to the second logical value, such as the logical zero. As illustrated in FIG. 8, the various combinations of the sensing chains 802.1 through 802.$m$ provide various transition rates 852.1 through 852.$n$ for the SA enable control signal 118 to transition from the first logical value, such as the logical one, to the second logical value, such as the logical zero. In this exemplary embodiment, the NAND sensing circuitry 800 can selectively activate more sensing chains 802.1 through 802.$m$ to increase the rate of this transition of the SA enable control signal 118 from the first logical value, such as the logical one, to the second logical value, such as the logical zero. Alternatively, or in addition to, the NAND sensing circuitry 800 can selectively deactivate more sensing chains 802.1 through 802.$m$ to decrease the rate of this transition of the SA enable control signal 118 from the first logical value, such as the logical one, to the second logical value, such as the logical zero. In a first example, the NAND sensing circuitry 800 can selectively activate all of the sensing chains 802.1 through 802.$m$ to provide a fastest transition rate 852.$n$ for the SA enable control signal 118. In a second example, the NAND sensing circuitry 800 can selectively activate only the sensing chain 802.1 to provide a slowest transition rate 852.1 for the SA enable control signal 118. The SA enable control signal 118 with the fastest transition rate 852.$n$ from the first example causes a sense amplifier, such as the sense amplifier 210 to provide an example, to read the electronic data on the bitline 216 and the bitline 218 earlier in time than the SA enable control signal 118 with the slowest transition rate 852.1 from the second example. In an exemplary embodiment, the electronic data on the bitline 216 and the bitline 218 is read at an instance in time when a difference, or read margin (RM), between the bitline 216 and the bitline 218 is largest. In this exemplary embodiment, the NAND sensing circuitry 800 can selectively activate only the sensing chain 802.2 to cause the sense amplifier to read the electronic data on the bitline 216 and the bitline 218 when the RM between the bitline 216 and the bitline 218 is largest.

As illustrated in FIG. 8, each of the sensing chains 802.1 through 802.m is implemented in a substantially similar manner as each other; therefore, only the sensing chain 802.1 from among the sensing chains 802.1 through 802.m is to be described in further detail. In the exemplary embodiment illustrated in FIG. 8, the sensing chain 802.1 includes the NMOS transistors N6 through N11. As illustrated in FIG. 8, the NMOS transistors N6 through N8 are arranged to form a first logical NAND gate and the NMOS transistors N9 through N11 are arranged to form a second logical NAND gate. As such, the first logical NAND gate sinks current from the SA enable control signal 118 when the bitline 216 and the bitline 218 remain greater than or equal to threshold voltages of the NMOS transistors N7 and N8 and the chain select control signal 350.1 is at the first logical value, such as the logical one. Similarly, the second logical NAND gate sinks current from the SA enable control signal 118 when the bitline 218 and the bitline 216 remain greater than or equal to threshold voltages of the NMOS transistors N10 and N11 and the chain select control signal 350.1 is at the first logical value, such as the logical one. In some situations, the sensing chain 802.1 can be implemented using either the first logical NAND gate or the second logical NAND gate. In these situations, the NMOS transistors of the first logical NAND gate or the second logical NAND gate are implemented using minimum sizing as defined by the semiconductor fabrication process.

Moreover, the sensing chain 802.1 can be characterized as a balanced coupled structure which balances a first parasitic capacitance between the bitline 216 and the SA enable control signal 118 and a second parasitic capacitance between the bitline 218 and the SA enable control signal 118 in a substantially similar manner as the sensing chain 302.1 as described above in FIG. 3. In the exemplary embodiment illustrated in FIG. 8, the sensing chain 802.1 balances contributions of the near parasitic capacitance and the far parasitic capacitance between the first logical NAND gate and the second logical NAND gate by twisting the bitline 216 and the bitline 218 between the first logical NAND gate and the second logical NAND gate. As illustrated in FIG. 8, this twisting of the bitline 216 and the bitline 218 is implemented by electrically coupling gates of the NMOS transistors N7 and N11 to the bitline 216 and gates of the NMOS transistors N8 and N10 to the bitline 218.

Figure 9:
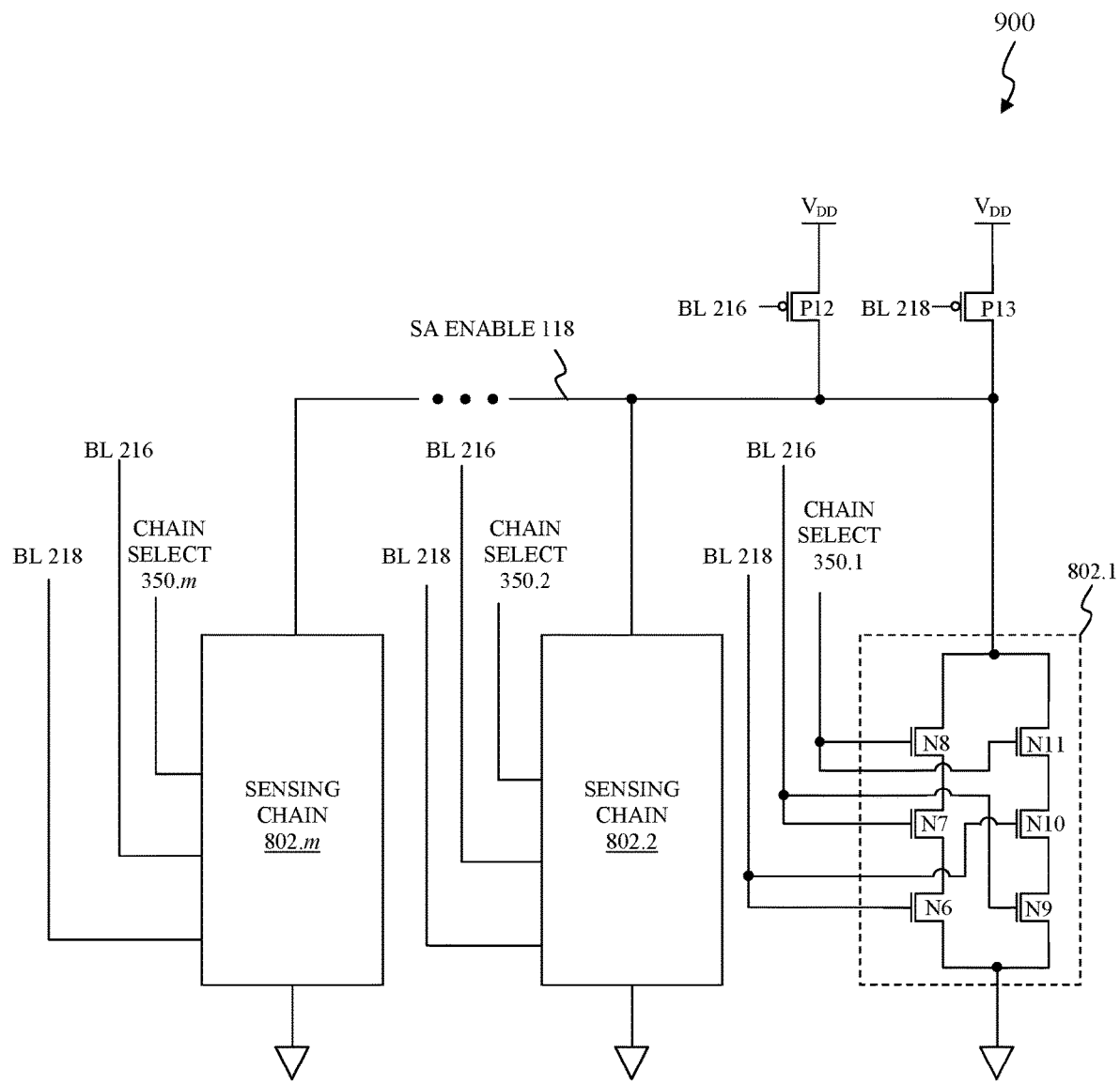
FIG. 9 illustrates a block diagram of seventh exemplary sensing circuitry that can be implemented within the memory storage device according to an exemplary embodiment of the present disclosure.

FIG. 9 illustrates a block diagram of seventh exemplary sensing circuitry that can be implemented within the memory storage device according to an exemplary embodiment of the present disclosure. NAND sensing circuitry 900 senses the electronic data on the bitline 216 and the bitline 218 to provide the SA enable control signal 118 in a substantially similar manner as the sensing circuitry 106 as described above in FIG. 1. As illustrated in FIG. 9, the NAND sensing circuitry 900 includes the sensing chains 802.1 through 802.m and PMOS transistors P12 and P13 as described above in FIG. 8. The NAND sensing circuitry 900 can represent an exemplary embodiment of the sensing circuitry 208 as described above in FIG. 2. The NAND sensing circuitry 900 shares many substantially similar features as the NAND sensing circuitry 800 as described above in FIG. 8; therefore, only differences between the NOR sensing circuitry 500 and the NAND sensing circuitry 900 are to be discussed in further detail below.

As illustrated in FIG. 9, the NMOS transistors N6 through N8 are arranged to form the first logical NAND gate and the PMOS transistors N9 through N11 are arranged to form the second logical NAND gate as described above in FIG. 3. However in the exemplary embodiment illustrated in FIG. 9, the first logical NAND gate sinks current from the SA enable control signal 118 when the bitline 216 and the bitline 218 remain greater than or equal to threshold voltages of the NMOS transistors N7 and N6 and the chain select control signal 350.1 is at the first logical value, such as the logical one. Similarly, the second logical NOR gate sinks current from the SA enable control signal 118 when the bitline 218 and the bitline 216 remain greater than or equal to threshold voltages of the NMOS transistors N10 and N9 and the chain select control signal 350.1 is at the first logical value, such as the logical one.

Figure 10:
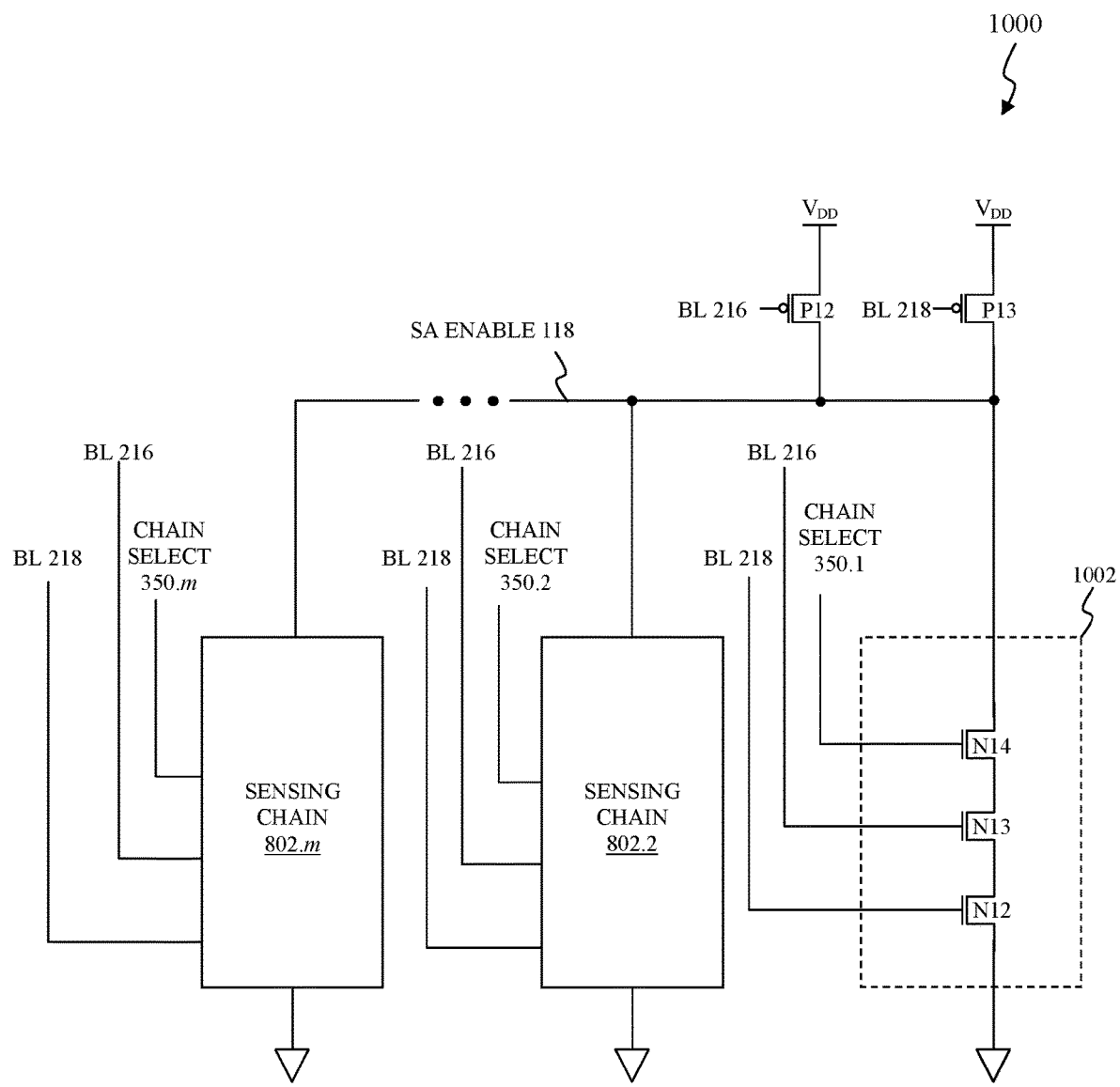
FIG. 10 illustrates a block diagram of eighth exemplary sensing circuitry that can be implemented within the memory storage device according to an exemplary embodiment of the present disclosure.

FIG. 10 illustrates a block diagram of eighth exemplary sensing circuitry that can be implemented within the memory storage device according to an exemplary embodiment of the present disclosure. NAND sensing circuitry 1000 senses the electronic data on the bitline 216 and the bitline 218 to provide the SA enable control signal 118 in a substantially similar manner as the sensing circuitry 104 as described above in FIG. 1. As illustrated in FIG. 10, the NAND sensing circuitry 1000 includes sensing chains 802.2 through 802.m, a sensing chain 1002, and the PMOS transistors P12 and P13. The NAND sensing circuitry 1000 can represent an exemplary embodiment of the sensing circuitry 208 as described above in FIG. 2. The NAND sensing circuitry 1000 shares many substantially similar features as the NAND sensing circuitry 800 as described above in FIG. 8; therefore, only differences between the NAND sensing circuitry 800 and the NAND sensing circuitry 1000 are to be discussed in further detail below.

As illustrated in FIG. 10, the NAND sensing circuitry 1000 includes the sensing chains 802.2 through 802.m as described above in FIG. 8. In the exemplary embodiment illustrated in FIG. 10, the sensing chain 1002 includes the NMOS transistors N12 through N14. The NMOS transistors N12 through N14 are arranged to form the first logical NAND gate as described above in FIG. 8. In the exemplary embodiment illustrated in FIG. 10, the NMOS transistors N12 through N14 are implemented using minimum sizing as defined by the semiconductor fabrication process. For example, the NMOS transistors N12 through N14 can be implemented a Fin Field-effect transistor (FinFET) having two (2) fins in a 16 nanometer (nm) semiconductor fabrication technology node.

Although FIG. 10 illustrates the NAND sensing circuitry 1000 as further including the sensing chain 1002 as a substitute for the sensing chain 802.1 as described above in FIG. 8, those skilled in the relevant art(s) will recognize any of the sensing chains 802.1 through 802.m as described above in FIG. 8 can be substituted with similar sensing chains 1002 which will be apparent to those skilled in the relevant art(s) without departing from the spirit and scope of the present disclosure.

Figure 11:
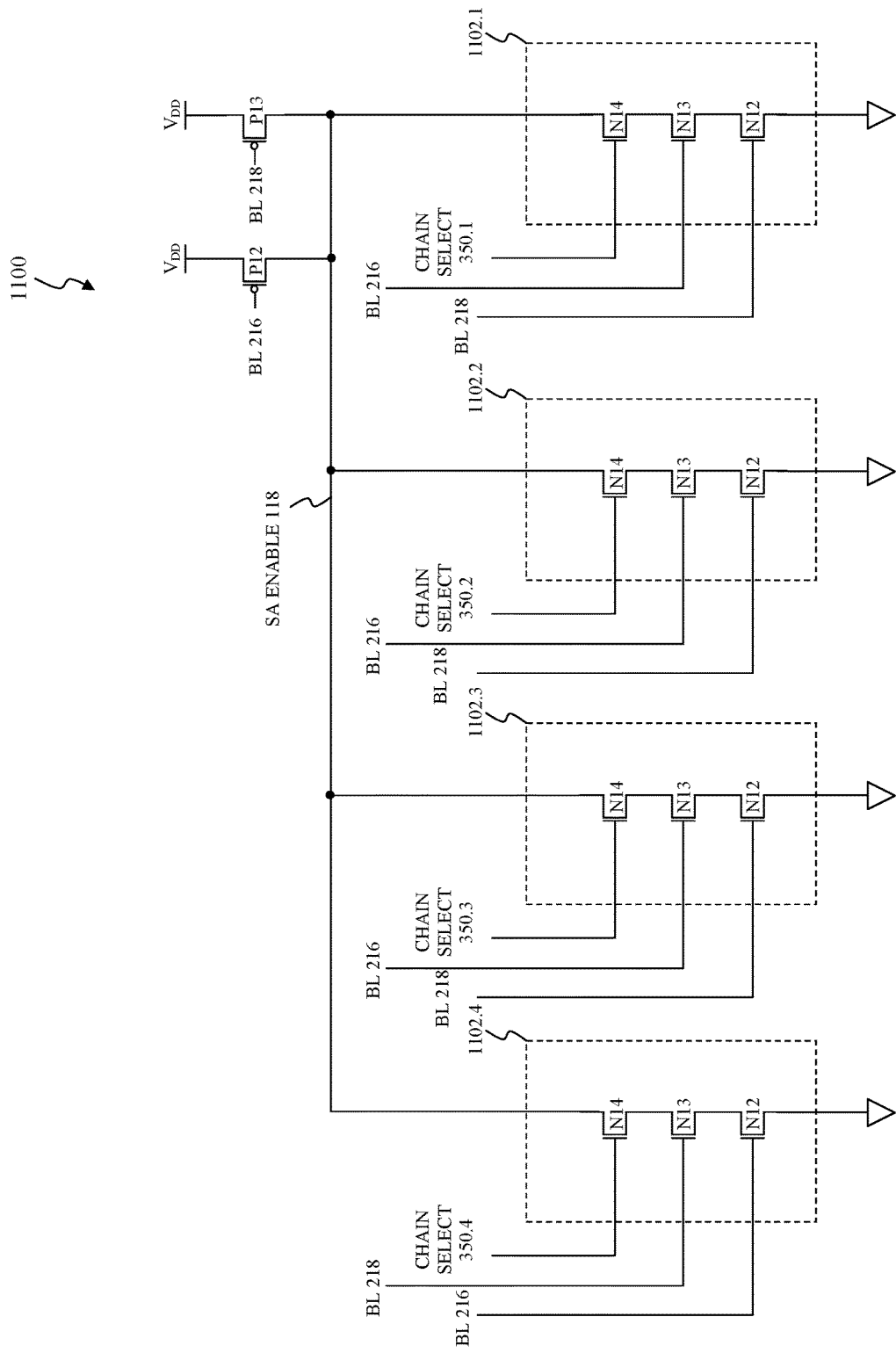
FIG. 11 illustrates a block diagram of ninth exemplary sensing circuitry that can be implemented within the memory storage device according to an exemplary embodiment of the present disclosure.

For example, FIG. 11 illustrates a block diagram of ninth exemplary sensing circuitry that can be implemented within the memory storage device according to an exemplary embodiment of the present disclosure. NAND sensing circuitry 1100 senses the electronic data on the bitline 216 and the bitline 218 to provide the SA enable control signal 118 in a substantially similar manner as the sensing circuitry 104 as described above in FIG. 1. As illustrated in FIG. 11, the NAND sensing circuitry 1100 includes sensing chains 1102.1 through 1102.4 and PMOS transistors P12 and P13. The NAND sensing circuitry 1100 can represent an exemplary embodiment of the sensing circuitry 208 as described above in FIG. 2. The NAND sensing circuitry 1100 shares many substantially similar features as the NAND sensing circuitry 800 as described above in FIG. 8; therefore, only differences between the NAND sensing circuitry 800 and the NAND sensing circuitry 1100 are to be discussed in further detail below.

In the exemplary embodiment illustrated in FIG. 11, the sensing chains 1102.1 through 1102.4 are implemented in a substantially similar manner as the sensing chain 1002 as described above in FIG. 10. Moreover as illustrated in FIG. 11, the sensing chains 1102.3 and 1102.4 balance contributions of the near parasitic capacitance and the far parasitic capacitance between the logical NAND gate of the sensing chain 1102.4 and the logical NAND gate of the sensing chain 1102.3 by twisting the bitline 216 and the bitline 218 between these logical NAND gates.

Figure 12:
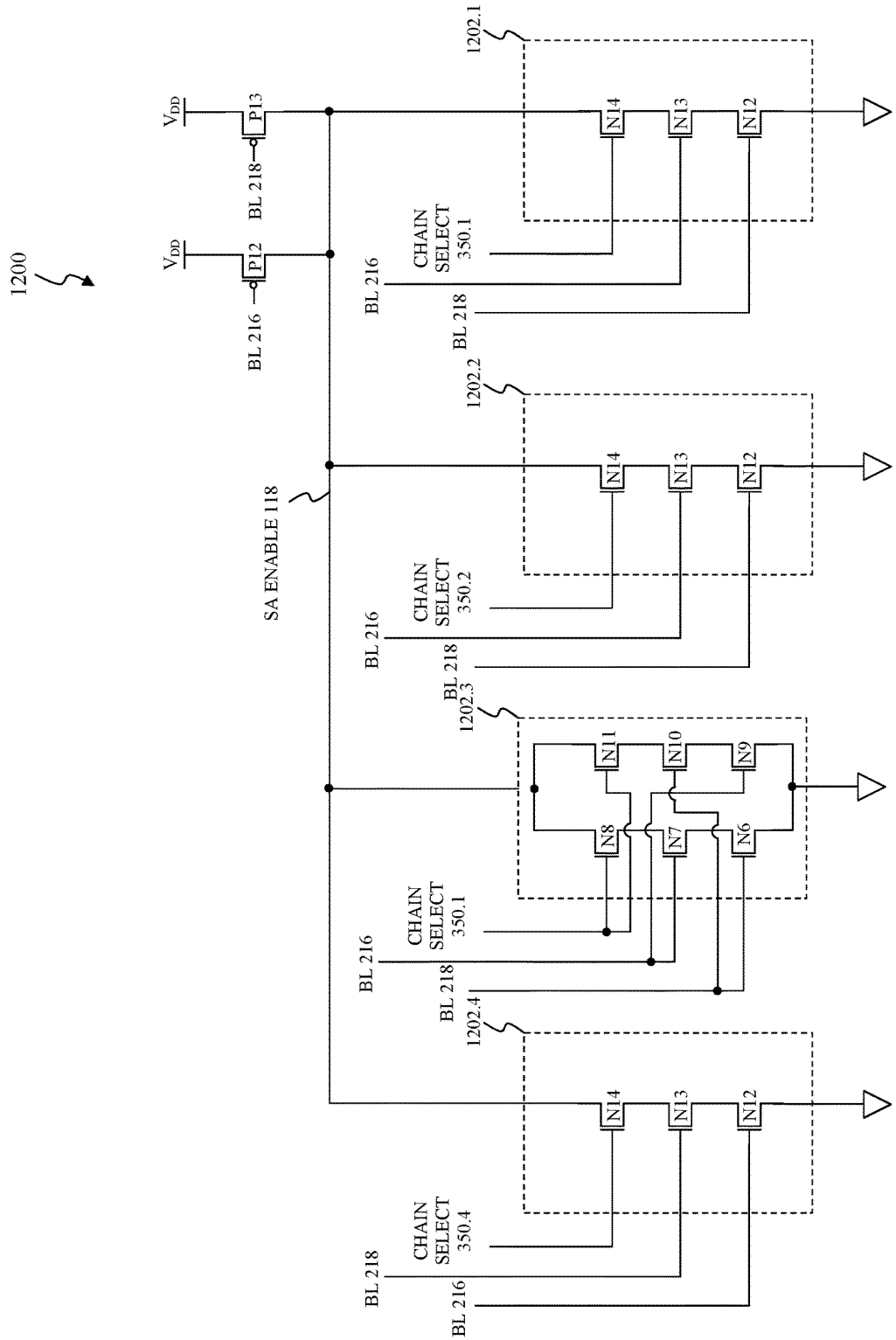
FIG. 12 illustrates a block diagram of tenth exemplary sensing circuitry that can be implemented within the memory storage device according to an exemplary embodiment of the present disclosure.

As another example, FIG. 12 illustrates a block diagram of tenth exemplary sensing circuitry that can be implemented within the memory storage device according to an exemplary embodiment of the present disclosure. NAND sensing circuitry 1200 senses the electronic data on the bitline 2112 and the bitline 218 to provide the SA enable control signal 118 in a substantially similar manner as the sensing circuitry 104 as described above in FIG. 1. As illustrated in FIG. 12, the NAND sensing circuitry 1200 includes sensing chains 1202.1 through 1202.4 and the PMOS transistors P12 and P13. The NAND sensing circuitry 1200 can represent an exemplary embodiment of the sensing circuitry 208 as described above in FIG. 2. The NAND sensing circuitry 1200 shares many substantially similar features as the NAND sensing circuitry 800 as described above in FIG. 8; therefore, only differences between the NAND sensing circuitry 800 and the NAND sensing circuitry 1200 are to be discussed in further detail below. In the exemplary embodiment illustrated in FIG. 12, the sensing chains 1202.1, 1202.2, and 1202.4 are implemented in a substantially similar manner as the sensing chain 1002 as described above in FIG. 10 and the sensing chain 1202.3 is implemented in a substantially similar manner as the sensing chain 802 as described above in FIG. 8.

Exemplary Operational Control Flow for the Exemplary Memory Storage Device

Figure 13:
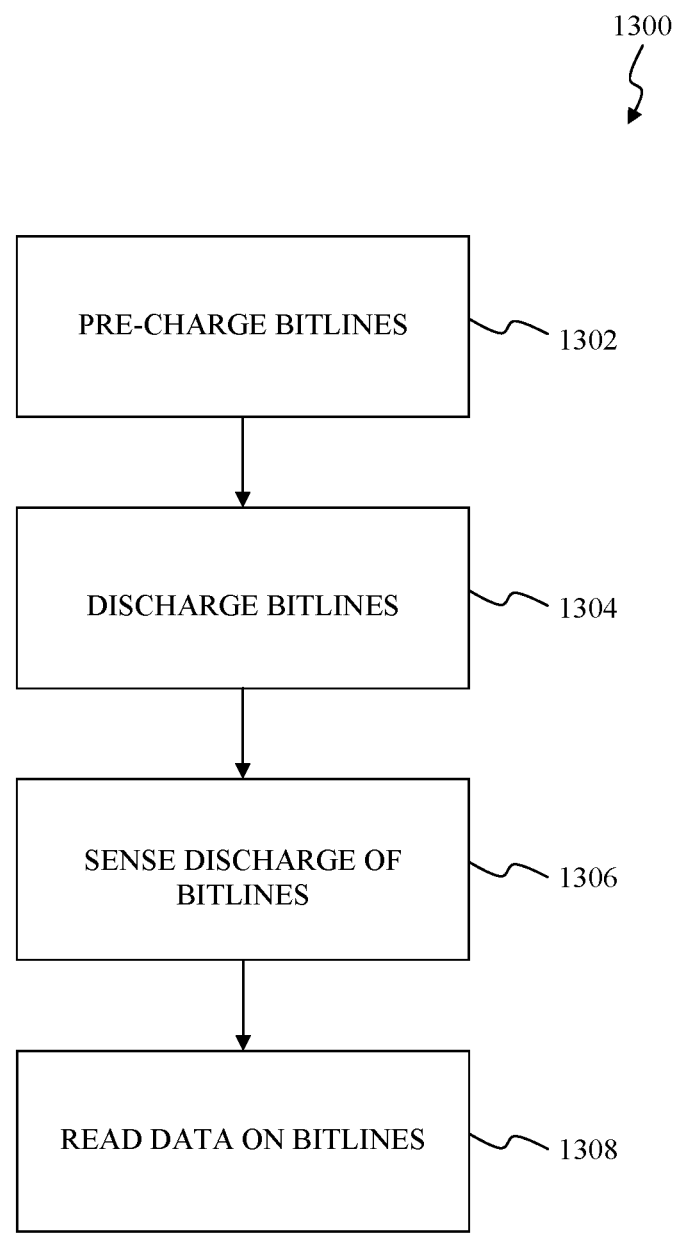
FIG. 13 illustrates a flowchart of exemplary operations for the exemplary memory storage device according to an exemplary embodiment of the present disclosure.

FIG. 13 illustrates a flowchart of exemplary operations for the exemplary memory storage device according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 1300 for an exemplary memory storage device, such as the memory storage device 200 as described above in FIG. 2 to implement a physical unclonable function (PUF) allowing the memory storage device to be differentiated from other memory storage devices similarly designed and fabricated by a semiconductor fabrication process.

At operation 1302, the exemplary operational control flow 1300 can charge, also referred to as pre-charge, bitlines of the memory storage device, such as the bitline 216 and/or the bitline 218 to provide some examples, to a first logical value, such as a logical one. This charging of the bitlines is referred to as pre-charging since it occurs before electronic data is read from the memory storage device. The pre-charge circuitry 206 as described above in FIG. 2 can be utilized to charge the bitlines of the memory storage device.

At operation 1304, the exemplary operational control flow 1300 discharges the bitlines from operation 1304. The exemplary operational control 1300 can assert various wordlines of the memory storage device to read the electronic data from the memory storage device. The electronic data from the memory storage device discharges the bitlines from operation 1304 from being at the first logical value, such as the logical one, to be at the second logical value, such as the logical zero.

At operation 1306, the exemplary operational control flow 1300 senses the discharge of the bitlines from operation 1304 to provide a trigger control signal, such as the SA enable control signal 118 to provide an example, to read the electronic data on the bitlines from operation 1304. The trigger control signal transitions from the second logical value, such as the logical zero, to the first logical value, such as the logical one, as the electronic data propagates along the bitlines from operation 1304. The exemplary operational control flow 1300 can control a rate of this transition, also referred to as a rise-time, to read the electronic data on the bitlines from operation 1304 at different instances in time. For example, the exemplary operational control flow 1300 can increase the rate of this transition to read the electronic data on the bitlines from operation 1304 earlier in time or decrease the rate of this transition to read the electronic data on the bitlines from operation 1304 later in time. The sensing circuitry 208 as described above in FIG. 2 can be utilized to sense the discharge of the bitlines from operation 1304 to provide the trigger control signal.

At operation 1308, the exemplary operational control flow 1300 reads the electronic data on the bitlines from operation 1304 in response to the trigger control signal from operation 1306. The exemplary operational control flow 1300 translates, namely, reads, bitlines having slower propagation times from among the bitlines from operation 1304 to be the first logical value, such as the logical one, and bitlines having faster propagation times from among the bitlines from operation 1304 to be the second logical value, such as the logical zero. The propagation times of the electronic data on the bitlines from operation 1304 can differ between the memory storage device and other memory storage devices similarly designed and fabricated by the semiconductor fabrication process. As such, the propagation times for the electronic data on the bitlines from operation 1304 can be utilized to implement a physical unclonable function (PUF) allowing the memory storage device to be differentiated from other memory storage devices similarly designed and fabricated by the semiconductor fabrication process. The sensing amplifier 210 as described above in FIG. 2 can be utilized to read the electronic data on the bitlines from operation 1304.

CONCLUSION

The foregoing Detailed Description discloses a memory storage device having pre-charge circuitry, memory cells, sensing circuitry, and a sense amplifier. The pre-charge circuitry charges the bitlines to a first logical value. The memory cells provide electronic data to the bitlines, the electronic data discharging the bitlines from the first logical value to a second logical value at different rates. The sensing circuitry senses discharging of the bitlines to provide a trigger control signal, the trigger control signal being at the second logical value and transitioning to the first logical value as the bitlines are discharging. The sense amplifier read the in response to the trigger control signal transitioning to the first logical value. Thereafter, the sense amplifier assigns a first bitline from the having a slowest discharge to be the first logical value and a second bitline from the bitlines having a fastest discharge to be the second logical value.

The foregoing Detailed Description additionally discloses a method for operating another memory storage device. The method includes providing electronic data to bitlines, the electronic data discharging the plurality of bitlines from a first logical value to a second logical value at different rates; reading the before at least one of the plurality of bitlines has settled to the second logical value; and assigning a first bitline from among the bitlines having a slowest discharge to be the first logical value and a second bitline from among the bitlines having a fastest discharge to be the second logical value.

The foregoing Detailed Description further discloses a further memory storage device including memory cells, sensing circuitry, and a sense amplifier. The memory cells provide electronic data to bitlines, the electronic data propagating along the bitlines at different rates. The sensing circuitry provides a trigger control signal, the trigger control signal transitioning from a first logical value to a second logical value before at least one of the bitlines has settled to its steady-state. The sense amplifier reads the bitlines in response to the trigger control signal transitioning from the first logical value to the second logical value, and assign a first bitline from among the bitlines having a slowest propagation time to be the second logical value and a second bitline from among the bitlines having a fastest propagation time to be the first logical value.

The foregoing Detailed Description referred to accompanying figures to illustrate exemplary embodiments consistent with the disclosure. References in the foregoing Detailed Description to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The foregoing Detailed Description is not meant to limiting. Rather, the scope of the disclosure is defined only in accordance with the following claims and their equivalents. It is to be appreciated that the foregoing Detailed Description, and not the following Abstract section, is intended to be used to interpret the claims. The Abstract section can set forth one or more, but not all exemplary embodiments, of the disclosure, and thus, is not intended to limit the disclosure and the following claims and their equivalents in any way.

The exemplary embodiments described within foregoing Detailed Description have been provided for illustrative purposes, and are not intended to be limiting. Other exemplary embodiments are possible, and modifications can be made to the exemplary embodiments while remaining within the spirit and scope of the disclosure. The foregoing Detailed Description has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The foregoing Detailed Description fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A memory storage device, comprising:
   pre-charge circuitry configured to charge a plurality of bitlines to a first logical value;
   a plurality of memory cells configured to provide electronic data to the plurality of bitlines, the electronic data discharging the plurality of bitlines from the first logical value to a second logical value at different rates;
   sensing circuitry configured to:
      sense the discharging of the plurality of bitlines to provide a trigger control signal, the trigger control signal being at the second logical value and transitioning to the first logical value as the plurality of bitlines are discharging; and
      control a rate of the transitioning of the trigger control signal to the first logical value; and
   a sense amplifier configured to:
      read the plurality of bitlines in response to the trigger control signal transitioning to the first logical value, and
      assign a first bitline from among the plurality of bitlines having a slowest discharge to be the first logical value and a second bitline from among the plurality of bitlines having a fastest discharge to be the second logical value.

2. The memory storage device of claim 1, wherein the sense amplifier is configured to read the plurality of bitlines before at least one of the plurality of bitlines has settled to the second logical value.

3. The memory storage device of claim 1, wherein the sensing circuitry comprises:
a plurality of sensing chains, and
wherein the sensing circuitry is configured to activate one or more first sensing chains from among the plurality of sensing chains to increase the rate of the transitioning of the trigger control signal to the first logical value or deactivate one or more second sensing chains from among the plurality of sensing chains to decrease the rate of the transitioning of the trigger control signal to the first logical value.

4. The memory storage device of claim 3, wherein at least one sensing chain from among the plurality of sensing chains comprises:
a first plurality of transistors arranged to form a first logic gate; and
a second plurality of transistors arranged to form a second logic gate,
wherein the plurality of bitlines are arranged to be twisted between the first logic gate and the second logic gate.

5. The memory storage device of claim 4, wherein the first logic gate and the second logic gate comprise:
logical NOR gates, or
logical NAND gates.

6. The memory storage device of claim 1, wherein the sense amplifier is configured to read the plurality of bitlines at an instance in time when a read margin (RM) between the plurality of bitlines is largest.

7. A method for operating a memory storage device, the method comprising:
providing, by the memory storage device, electronic data to a plurality of bitlines, the electronic data discharging the plurality of bitlines from a first logical value to a second logical value at different rates;
reading the plurality of bitlines before at least one of the plurality of bitlines has settled to the second logical value, the reading including sensing the discharging of the plurality of bitlines to provide a trigger control signal, the trigger control signal being at the second logical value and transitioning to the first logical value as the plurality of bitlines are discharging; and
assigning, in response to the trigger control signal transitioning to the first logical value, a first bitline from among the plurality of bitlines having a slowest discharge to be the first logical value and a second bitline from among the plurality of bitlines having a fastest discharge to be the second logical value.

8. The method of claim 7, wherein the sensing comprises:
controlling a rate of the transitioning of the trigger control signal to the first logical value.

9. The method of claim 8, wherein the controlling comprises:
increasing the rate of the transitioning of the trigger control signal to the first logical value to read the plurality of bitlines at an earlier instance in time.

10. The method of claim 8, wherein the controlling comprises:
decreasing the rate of the transitioning of the trigger control signal to the first logical value to read the plurality of bitlines at a later instance in time.

11. A memory storage device, comprising:
a plurality of memory cells, coupled to a plurality of bitlines, configured to provide electronic data to the plurality of bitlines, the electronic data propagating along the plurality of bitlines at different rates;
sensing circuitry configured to:
provide a trigger control signal, the trigger control signal transitioning from a first logical value to a second logical value before at least one of the plurality of bitlines has settled to its steady-state; and
control a rate of the transitioning of the trigger control from the first logical value to the second logical value; and
a sense amplifier configured to:
read the plurality of bitlines in response to the trigger control signal transitioning from the first logical value to the second logical value, and
assign a first bitline from among the plurality of bitlines having a slowest propagation time to be the second logical value and a second bitline from among the plurality of bitlines having a fastest propagation time to be the first logical value.

12. The memory storage device of claim 11, further comprising:
pre-charge circuitry configured to charge the plurality of bitlines to the second logical value.

13. The memory storage device of claim 12, wherein the electronic data is configured to discharge the plurality of bitlines from the second logical value to the first logical value at different rates.

14. The memory storage device of claim 11, wherein the sensing circuitry comprises:
a plurality of sensing chains, and
wherein the sensing circuitry is configured to activate one or more first sensing chains from among the plurality of sensing chains to increase the rate of the transitioning of the trigger control signal or to deactivate one or more second sensing chains from among the plurality of sensing chains to decrease the rate of the transitioning of the trigger control signal.

15. The memory storage device of claim 14, wherein at least one sensing chain from among the plurality of sensing chains comprises:
a first plurality of transistors arranged to form a first logic gate; and
a second plurality of transistors arranged to form a second logic gate,
wherein the plurality of bitlines are arranged to be twisted between the first logic gate and the second logic gate.

16. The memory storage device of claim 15, wherein the first logic gate and the second logic gate comprise:
logical NOR gates, or
logical NAND gates.

17. The memory storage device of claim 11, wherein the sense amplifier is configured to read the plurality of bitlines at an instance in time when a read margin (RM) between the plurality of bitlines is largest.

18. The memory storage device of claim 1, wherein the sensing circuitry is configured to increase the rate of transitioning of the trigger control signal to the first logical value.

19. The memory storage device of claim 1, wherein the sensing circuitry is configured to decrease the rate of transitioning of the trigger control signal to the first logical value.

20. The memory storage device of claim 11, wherein the sensing circuitry is configured to increase the rate of transitioning of the trigger control signal to the second logical value.

* * * * *